United States Patent
Ichikawa et al.

(10) Patent No.: US 12,023,787 B2
(45) Date of Patent: Jul. 2, 2024

(54) ELECTRIC POWERED WORK MACHINE, JOB-SITE ELECTRICAL SYSTEM, AND METHOD OF DIAGNOSING ELECTRIC POWERED WORK MACHINE

(71) Applicant: MAKITA CORPORATION, Anjo (JP)

(72) Inventors: Yoshitaka Ichikawa, Anjo (JP); Takuya Kusakawa, Anjo (JP)

(73) Assignee: MAKITA CORPORATION, Anjo (JP)

( * ) Notice: Subject to any disclaimer, the term of this patent is extended or adjusted under 35 U.S.C. 154(b) by 676 days.

(21) Appl. No.: 17/145,965

(22) Filed: Jan. 11, 2021

(65) Prior Publication Data
US 2021/0213593 A1    Jul. 15, 2021

(30) Foreign Application Priority Data

Jan. 15, 2020   (JP) .................................. 2020-004474

(51) Int. Cl.
| | |
|---|---|
| B25B 23/147 | (2006.01) |
| B25B 21/02 | (2006.01) |
| B25F 5/00 | (2006.01) |
| H02P 29/024 | (2016.01) |

(52) U.S. Cl.
CPC .......... B25B 23/1475 (2013.01); B25B 21/02 (2013.01); B25F 5/00 (2013.01); H02P 29/024 (2013.01)

(58) Field of Classification Search
CPC ....... B25F 5/00; H02P 29/024; G05B 19/0423
See application file for complete search history.

(56) References Cited

U.S. PATENT DOCUMENTS

| | | | |
|---|---|---|---|
| 6,607,041 B2 * | 8/2003 | Suzuki | B25F 5/00 173/4 |
| 9,766,608 B2 * | 9/2017 | Wuertele | G05B 19/042 |
| 2014/0107853 A1 | 4/2014 | Ashinghurst et al. | |
| 2014/0151079 A1 | 6/2014 | Furui et al. | |
| 2014/0159662 A1 | 6/2014 | Furui et al. | |
| 2014/0159919 A1 | 6/2014 | Furui et al. | |
| 2014/0159920 A1 | 6/2014 | Furui et al. | |
| 2015/0132613 A1 | 5/2015 | Iwamura et al. | |

(Continued)

FOREIGN PATENT DOCUMENTS

| | | |
|---|---|---|
| DE | 102011121448 A1 | 6/2013 |
| JP | 2015-094678 A | 5/2015 |

(Continued)

OTHER PUBLICATIONS

Aug. 8, 2023 Office Action issued in Japanese Patent Application No. 2020-004474.

*Primary Examiner* — Ricky Go
(74) *Attorney, Agent, or Firm* — Oliff PLC

(57) ABSTRACT

An electric powered work machine in one aspect of the present disclosure includes a motor, a tool driver, a command receiver, a diagnosis circuit, and a result transmitter. The diagnosis circuit executes a failure diagnosis of the electric powered work machine in response to the command receiver receiving a diagnosis command signal from a diagnosis device. The result transmitter transmits a diagnosis result signal to the diagnosis device. The diagnosis result signal indicates a result of the failure diagnosis that is executed by the diagnosis circuit.

17 Claims, 14 Drawing Sheets

(56) References Cited

U.S. PATENT DOCUMENTS

| | | | |
|---|---|---|---|
| 2017/0162035 A1* | 6/2017 | Kusakawa | G08C 17/02 |
| 2018/0076639 A1 | 3/2018 | Furui et al. | |
| 2018/0123500 A1 | 5/2018 | Heston | |
| 2018/0277804 A1* | 9/2018 | Lee | H02J 7/00036 |
| 2019/0250206 A1 | 8/2019 | Noguchi et al. | |
| 2019/0334357 A1 | 10/2019 | Furui et al. | |
| 2020/0106380 A1* | 4/2020 | Sheeks | H02P 6/26 |
| 2020/0227927 A1* | 7/2020 | Thiele | H02J 7/00032 |
| 2020/0343744 A1 | 10/2020 | Furui et al. | |

FOREIGN PATENT DOCUMENTS

| | | |
|---|---|---|
| JP | 2019-025611 A | 2/2019 |
| JP | 2019-123027 A | 7/2019 |
| JP | 2019-171523 A | 10/2019 |
| JP | 2019-535376 A | 12/2019 |
| WO | 2013/014915 A2 | 1/2013 |
| WO | 2018/042982 A1 | 3/2018 |

* cited by examiner

ELECTRIC POWERED WORK MACHINE, JOB-SITE ELECTRICAL SYSTEM, AND METHOD OF DIAGNOSING ELECTRIC POWERED WORK MACHINE

CROSS-REFERENCE TO RELATED APPLICATIONS

This application claims the benefit of Japanese Patent Application No. 2020-004474 filed on Jan. 15, 2020 with the Japan Patent Office, the entire disclosure of which is incorporated herein by reference.

BACKGROUND

The present disclosure relates to a diagnosis of an electric powered work machine.

Japanese Unexamined Patent Application Publication No. 2019-123027 discloses an electric powered work machine that is configured to estimate a failure part in the electric powered work machine based on a usage history stored in the electric powered work machine and to notify a user of the electric powered work machine of the estimated failure part.

SUMMARY

The above-described electric powered work machine merely estimates a failure part based on a usage history as described above and does not locate the failure part based on the most recent state of the electric powered work machine.

Furthermore, the above-described electric powered work machine does not locate the failure part by practically driving the electric powered work machine.

In one aspect of the present disclosure, it is desirable to locate a failure part in an electric powered work machine with improved accuracy.

In one aspect of the present disclosure, an electric powered work machine (or an electric working machine) includes a motor, a tool driver, a command receiver, a diagnosis circuit, and/or a result transmitter. The motor generates a rotating force. The tool driver receives the rotating force to thereby drive a tool. The command receiver receives a diagnosis command signal from a diagnosis device. The diagnosis circuit executes a failure diagnosis of the electric powered work machine in response to the command receiver receiving the diagnosis command signal. The result transmitter transmits a diagnosis result signal to the diagnosis device. The diagnosis result signal indicates a result of the failure diagnosis that is executed by the diagnosis circuit.

The aforementioned electric powered work machine practically executes the failure diagnosis in response to receipt of the diagnosis command signal from the diagnosis device. Consequently, it is possible to locate (or specify or identify) a failure part with enhanced accuracy in comparison with estimation of the failure part.

The aforementioned electric powered work machine does not estimate the failure part based on the past usage history information, but rather locates the failure part based on the most recent state of the electric powered work machine. Thus, the aforementioned electric powered work machine can locate the failure part with enhanced accuracy based on the most recent state of the electric powered work machine.

The electric powered work machine may further include a voltage detector, a display, and/or a manipulation switch. The voltage detector detects a voltage of a battery that supplies an electric power to the motor. The display provides information relating to the electric powered work machine. The manipulation switch is manipulated by a user of the electric powered work machine. The diagnosis circuit may diagnose the voltage detector, the display, and/or the manipulation switch in the failure diagnosis.

Such an electric powered work machine can locate a failure(s) of the voltage detector, the display, and/or the manipulation switch.

The display may include LEDs. The diagnosis circuit may, in the failure diagnosis, (i) drive the LEDs so that the display is placed in a specified display state and (ii) diagnose the display based on a magnitude of an electric current that flows through the LEDs. The specified display state may correspond to all the LEDs being turned on or being turned off.

The electric powered work machine may further include a motor driving circuit, a motor current detector, and/or a rotational position detector. The motor driving circuit supplies an electric current to the motor. The motor current detector detects a magnitude of the electric current that flows through the motor. The rotational position detector detects a rotational position of the motor.

The diagnosis circuit may diagnose the motor driving circuit, the motor current detector, and/or the rotational position detector in the failure diagnosis. Such an electric powered work machine can locate the failure part related to driving of the motor with enhanced accuracy.

The diagnosis circuit may sequentially diagnose the motor driving circuit, the motor current detector, and the rotational position detector in the failure diagnosis in an order of the motor driving circuit, the motor current detector, and the rotational position detector.

If the motor driving circuit fails, the motor cannot be supplied with the electric current and therefore, the motor cannot be driven. In other words, if the motor driving circuit fails, the motor current detector cannot detect the magnitude of the electric current in spite of a non-failure of the motor current detector. Alternately, if the motor driving circuit fails, the rotational position detector cannot detect the rotational position of the motor in spite of a non-failure of the rotational position detector.

According to the aforementioned order, it is possible to firstly locate a failure of the motor driving circuit. Consequently, it is possible to inhibit the failure of the motor driving circuit from resulting in an erroneous location that the motor current detector and/or the rotational position detector fail(s).

If the motor current detector fails, the motor current detector cannot properly detect the magnitude of the electric current flowing through the motor. This consequently leads to a possible serious risk in which it is not possible to detect an excessive electric current flowing through the motor. The diagnosis of the motor current detector is given with a higher priority than the diagnosis of the rotational position detector is and therefore, it is possible to find the failure of the motor current detector at an earlier stage and to inhibit occurrence of the serious risk. Accordingly, in such an electric powered work machine, it is possible to inhibit occurrence of a serious risk in addition to an erroneous location of the failure part.

The motor driving circuit may be configured in any manner. The motor driving circuit may include switching devices that are configured to conduct or interrupt the electric current to the motor.

The diagnosis circuit may diagnose the motor driving circuit in any manner. The diagnosis circuit may, in the failure diagnosis, (i) turn ON the switching devices at least one by one alternately and (ii) diagnose the motor driving circuit based on the magnitude of the electric current that is detected by the motor current detector.

The diagnosis circuit may diagnose the motor current detector in any manner. The diagnosis circuit may, in the failure diagnosis, (i) supply the electric current to the motor via the motor driving circuit and (ii) diagnose the motor current detector based on the magnitude of the electric current that is detected by the motor current detector.

The diagnosis circuit may diagnose the rotational position detector in any manner. The diagnosis circuit may, in the failure diagnosis, (i) rotate the motor at a specified rotational speed and (ii) diagnose the rotational position detector based on the rotational position that is detected by the rotational position detector.

The electric powered work machine may receive an electric power from an external power supply via a power cord. Alternately, the electric powered work machine may receive an electric power from a mobile power source such as a battery pack. The battery pack may have an electric power to be supplied to the motor.

The electric powered work machine may include an external device connector configured to be alternately connected to the diagnosis device or the battery pack.

The electric powered work machine may further include a battery communication processor. The battery communication processor may communicate with the battery pack, which is connected to the external device connector. The battery communication processor may transmit a signal related to the battery pack or receive the signal related to the battery pack from the battery pack.

The command receiver may receive the diagnosis command signal from the diagnosis device connected to the external device connector.

The result transmitter may transmit the diagnosis result signal to the diagnosis device connected to the external device connector.

Such an electric powered work machine communicates with the battery pack in a case where the external device connector is connected to the battery pack. In contrast, in a case where the external device connector is connected to the diagnosis device, the electric powered work machine receives the diagnosis command signal from the diagnosis device, while transmitting the diagnosis result signal to the diagnosis device.

In other words, the electric powered work machine is not concurrently connected to both the battery pack and the diagnosis device. Consequently, the failure diagnosis is executed exclusively to a case where the electric powered work machine is connected to the diagnosis device. Accordingly, it is possible to inhibit the failure diagnosis from being executed without intention of the user of the electric powered work machine. Therefore, it is possible to inhibit occurrence of an accident such as an injury of the user as a result of the electric powered work machine operating due to execution of the failure diagnosis.

The external device connector may be configured in any manner. The external device connector may include an electric power terminal that is configured to receive the electric power supplied to the motor from the battery pack in response to the external device connector being connected to the battery pack. Moreover/alternately, the external device connector may include a signal terminal that is configured to complete a communication path between the battery communication processor and the battery pack in response to the external device connector being connected to the battery pack.

The signal terminal may be configured (i) to receive the diagnosis command signal from the diagnosis device and (ii) to receive the diagnosis result signal from the result transmitter in response to the external device connector being connected to the diagnosis device.

The electric powered work machine may further include a diagnosis device connector that is configured to be connected to the diagnosis device.

The electric powered work machine may further include a battery pack connector that is configured to be connected to the battery pack. The electric powered work machine may include a first transmission path that is configured to transmit the diagnosis command signal from the diagnosis device connector to the command receiver.

The electric powered work machine may include a second transmission path that is configured to transmit the diagnosis result signal from the result transmitter to the diagnosis device connector.

Such an electric powered work machine can locate the failure part, while receiving the electric power from the battery pack. The first transmission path and the second transmission path may be a wired path or a wireless path. The electric powered work machine may further include a wireless communicator that is configured to perform a wireless communication with the diagnosis device. The command receiver may receive the diagnosis command signal from the diagnosis device via the wireless communicator. The result transmitter may transmit the diagnosis result signal to the diagnosis device via the wireless communicator.

In another aspect of the present disclosure, a job-site electrical system includes the diagnosis device in addition to the aforementioned electric powered work machine. The diagnosis device may be configured (i) to transmit the diagnosis command signal to the electric powered work machine and (ii) to receive the diagnosis result signal from the electric powered work machine.

Such a job-site electrical system can locate the failure part of the electric powered work machine with enhanced accuracy.

In still another aspect of the present disclosure, a method of diagnosing an electric powered work machine includes:
  transmitting a diagnosis command signal from a diagnosis device to the electric powered work machine;
  executing a failure diagnosis of the electric powered work machine by the electric powered work machine in response to the electric powered work machine receiving the diagnosis command signal; and/or
  transmitting a diagnosis result signal from the electric powered work machine to the diagnosis device, the diagnosis result signal indicating a result of the failure diagnosis.

According to such a method, it is possible to locate the failure part of the electric powered work machine with improved accuracy.

BRIEF DESCRIPTION OF THE DRAWINGS

Example embodiments of the present disclosure will be described hereinafter with reference to the accompanying drawings, in which.

DETAILED DESCRIPTION OF EXEMPLARY EMBODIMENTS

The present disclosure is not limited to example embodiments described below and may take various forms as long as it falls within the technical scope of the present disclosure.

1. First Embodiment

[1-1. Configuration of Electric Powered Work Machine]

Figure 1:
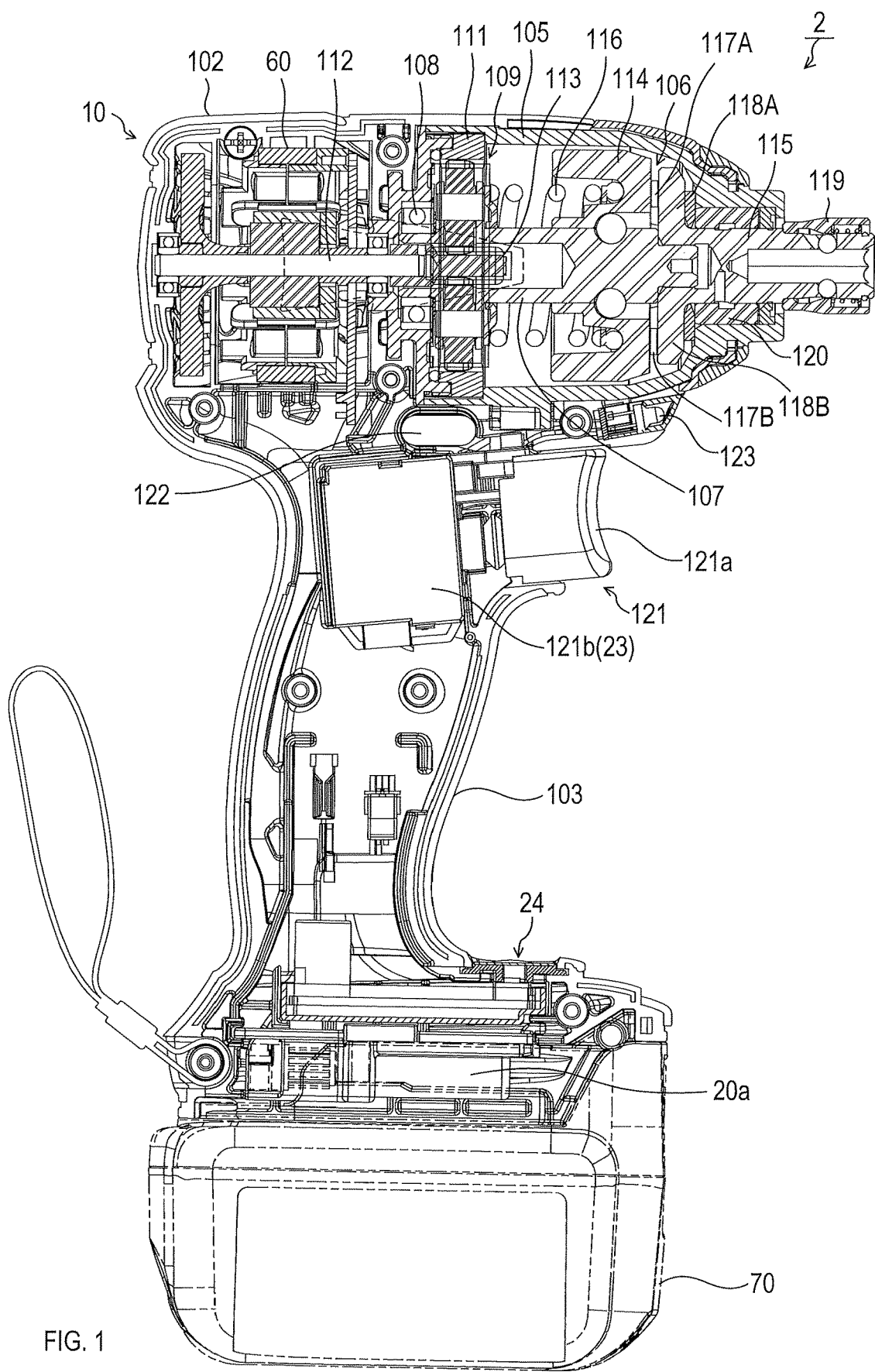
FIG. 1 is a vertical sectional view of an electric powered work machine of a first embodiment.

As shown in FIG. 1, an electric powered work machine 2 of the first embodiment is a cordless (or rechargeable) impact driver. The electric powered work machine according to the present disclosure is not limited to the cordless impact driver and includes any device, such as an electric power tool and a gardening tool, that is configured to drive a tool by a rotating force (driving force) of a motor. Examples of the electric power tool include a circular saw, a driver drill, a cleaner, and a hammer drill. Examples of the gardening tool include a grass mower, a trimmer, and a blower.

The electric powered work machine 2 includes a first tool main body 10. The first tool main body 10 includes a housing 102. The housing 102 accommodates a motor 60 in a rear portion of the housing 102 (at left side in FIG. 1). The housing 102 has a hammer case 105 assembled thereto in front of the motor 60 (at the right side in FIG. 1). The hammer case 105 has a bell-shape and accommodates an impact mechanism 106 therein. The impact mechanism 106 includes a spindle 107, which is hollowed.

The spindle 107 is accommodated in a rear end of the hammer case 105. The hammer case 105 is provided with, in its inner rear end, a ball bearing 108. The ball bearing 108 supports an outer circumference of the spindle 107 at a rear end of the spindle 107.

In front of the ball bearing 108, an epicyclic gearing 109 is provided. The epicyclic gearing 109 includes a pair of epicyclic gears (not shown) that is rotatably supported in point symmetry with respect to the spindle 107. The hammer case 105 is provided with, on its rear inner circumferential surface, an internal gear 111. The epicyclic gearing 109 is meshed with the internal gear 111.

The motor 60 includes an output shaft 112. The output shaft 112 is provided with a pinion 113 on a leading end of the output shaft 112. The epicyclic gearing 109 is meshed with the pinion 113.

In addition to the above-described spindle 107, the impact mechanism 106 includes a hammer 114, an anvil 115, and a coil spring 116.

The hammer 114 is provided on the outer circumference of the spindle 107. More specifically, the hammer 114 is coupled to the spindle 107 such that the hammer 114 can rotate with the spindle 107 as one integral member and move in an axial direction. The hammer 114 is biased frontward by the coil spring 116.

The anvil 115 is provided in front of the hammer 114. The anvil 115 receives a leading end of the spindle 107 at a rear end of the anvil 115 and is rotatably supported by the spindle 107.

The housing 102 is provided with, in its leading end, a bearing 120. The anvil 115 is supported by the bearing 120 such that the anvil 115 can freely rotate about the spindle 107 and is prohibited from being displaced along the spindle 107.

The anvil 115 is provided with, on its leading end, a chuck sleeve 119. The chuck sleeve 119 is configured to have various tool bits (illustration omitted), such as a driver bit and a socket bit, attached thereto. As is apparent from FIG. 1, the output shaft 112 of the motor 60, the spindle 107, the hammer 114, the anvil 115, and the chuck sleeve 119 are coaxially arranged.

The hammer 114 is provided with, on its front end surface, a first impact protrusion 117A and a second impact protrusion 117B. The first impact protrusion 117A and the second impact protrusion 117B are separated from one another at an angle of 180° in a circumferential direction. The first impact protrusion 117A and the second impact protrusion 117B apply an impact force to the anvil 115.

The anvil 115 is provided with, in its rear end, a first impact arm 118A and a second impact arm 118B. The first impact arm 118A and the second impact arm 118B are separated from one another at an angle of 180° in the circumferential direction.

The hammer 114 is biased towards a front end of the spindle 107 and held by a biasing force of the coil spring 116. In response to this, the first impact protrusion 117A and the second impact protrusion 117B abut against the first impact arm 118A and the second impact arm 118B, respectively.

With the first and the second impact protrusions 117A, 117B abutting against the first and the second impact arms 118A, 118B, the spindle 107 rotates by ways of the epicyclic gearing 109 due to a rotating force of the motor 60. In response to this, the hammer 114 rotates together with the spindle 107 and the rotating force of the hammer 114 is transmitted to the anvil 115 via the first and the second impact protrusions 117A, 117B and the first and the second impact arms 118A, 118B.

As a result of transmission of the rotating force of the hammer 114 to the anvil 115, the tool bit attached to the leading end of the anvil 115 rotates. If the driver bit is attached to the leading end of the anvil 115, rotation of the driver bit enables fastening of a screw.

In response to the screw being fastened to a specified position (or a specified depth), a torque equal to or greater than a specified torque is applied to the anvil 115. In relation to this, the rotating force (i.e., torque) of the hammer 114 against the anvil 115 becomes equal to or greater than the specified torque.

Consequently, the hammer 114 is displaced rearward against the biasing force of the coil spring 116 and the first and the second impact protrusions 117A, 117B climb over respective upper surfaces of the first and the second impact arms 118A, 118B. That is, the first and the second impact protrusions 117A, 117B are temporarily disengaged from the first and the second impact arms 118A, 118B, respectively.

Subsequently, the hammer 114 is displaced frontward again by the biasing force of the coil spring 116 while rotating with the spindle 107, and the first and the second impact protrusions 117A, 117B impact the first and the second impact arms 118A, 118B, respectively, in a rotation direction of the hammer 114.

Accordingly, in the electric powered work machine 2 of the first embodiment, every time a torque equal to or greater than the specified torque is applied to the anvil 115, the hammer 114 repeatedly impacts the anvil 115. This intermittent application of the impact force of the hammer 114 to the anvil 115 enables a screw to be fastened at a high torque to a work piece.

The first tool main body 10 includes a grip 103 that protrudes from a lower portion (lower side in FIG. 2) of the housing 102. The grip 103 is configured to be gripped by a user of the electric powered work machine 2. A trigger 121 is provided above the grip 103.

The trigger 121 includes a manipulated portion 121a and a detector 121b. The manipulated portion 121a is configured to be manipulated by the user, more specifically, to be pulled by a finger of the user.

The detector 121b detects a manipulated state of the manipulated portion 121a. More specifically, the detector 121b includes a trigger switch 23 (hereinafter, switch is described as SW) and a manipulated amount sensor (illustration omitted). The trigger SW 23 is configured to be turned ON by triggering (or pulling) the manipulated portion 121a. The manipulated amount sensor is configured such that an electric resistance value of the manipulated amount sensor varies in accordance with a manipulated amount (pulling amount) of the manipulated portion 121a.

On the top of the trigger 121 (a lower end of the housing 102), a rotation direction selection SW 122 is provided for switching a rotation direction of the motor 60 to a forward direction or a reverse direction. In the first embodiment, the forward direction of the motor 60 corresponds to a clockwise direction in a state where the front is viewed from a rear end of the electric powered work machine 2. The reverse direction of the motor 60 corresponds to a rotation direction opposite to the forward direction.

The housing 102 is provided with, in its lower front portion, an illuminator 123. The illuminator 123 emits a light frontward of the electric powered work machine 2 in response to a pulling operation of the trigger 121. The illuminator 123 of the first embodiment includes a LED(s) as a light source(s).

The grip 103 is provided with, in its front lower portion, a display panel 24. The display panel 24 displays remaining electric energy of a battery pack 70 that is attached to the first tool main body 10 and/or an operation mode of the electric powered work machine 2.

The grip 103 may include a mode change SW (illustration omitted), an impact force selection SW (illustration omitted), and an illuminator SW (illustration omitted) in the vicinity of the display panel 24.

The electric powered work machine 2 may have two or more operation modes. The two or more operation modes may include a normal mode and a speed shifting mode. The normal mode is a setting to control a rotation of the motor 60 in accordance with the pulling amount of the trigger 121. The speed shifting mode is a setting to switch the rotation of the motor 60 from a low-speed rotation to a high-speed rotation. These operation modes are switched by the mode change SW.

More specifically, the mode change SW is placed in an ON-state while being manipulated (pressed) by the user. Every time the mode change SW is manipulated, the electric powered work machine 2 is alternately set to the normal mode or the speed shifting mode.

The impact force selection SW is a switch for selecting a magnitude of the impact force to be applied to the anvil 115 by the hammer 114 (consequently, a magnitude of a torque to be applied to the tool bit). More specifically, the impact force selection SW selects one control pattern among preset control patterns. In each of the preset control patterns, a rotational frequency of the motor 60 corresponding to the low speed rotation and a rotational frequency of the motor 60 corresponding to the high-speed rotation are individually set. Moreover/alternately, in each of the preset control patterns, a rate of change in rotational frequency of the motor 60 from the low-speed rotation to the high-speed rotation is individually set. The impact force selection SW is enabled when the operation mode is set to the speed shifting mode. When the operation mode is set to the normal mode, the impact force selection SW is disabled.

The illuminator SW is a switch for determining whether to turn on the illuminator 123 in response to the trigger 121 being pulled.

The grip 103 includes a first connector 20a in a lower end thereof. The first connector 20a is configured to be detachably connected to the battery pack 70. The battery pack 70 is slid on the first connector 20a from the front to the rear, thereby being attached to the grip 103.

[1-2. Electrical Configuration]

Figure 2:
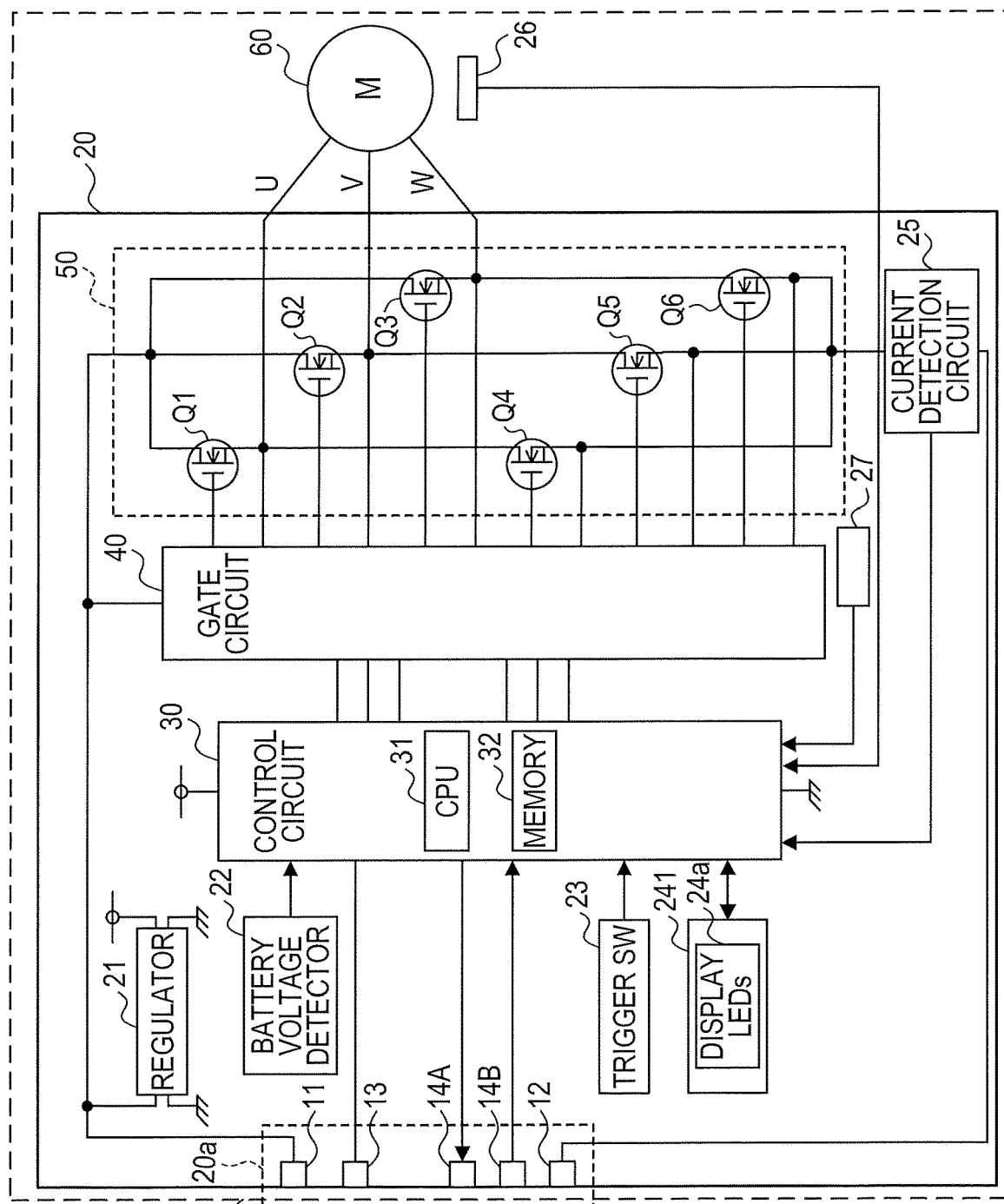
FIG. 2 is a block diagram showing an electrical configuration of a job-site electrical system of the first embodiment.
Figure 2:
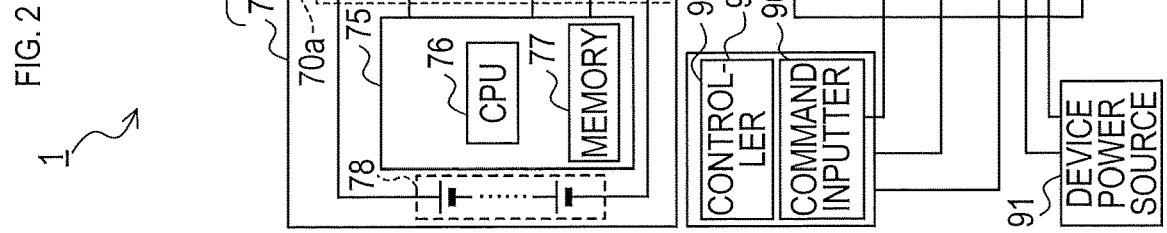

With reference to FIG. 2, descriptions are given to an electrical configuration of the electric powered work machine 2.

As shown in FIG. 2, the first tool main body 10 includes a controller 20 and a rotation sensor 26 in addition to the above-described motor 60.

In the first embodiment, the motor 60 is a three-phase brushless motor. Thus, the motor 60 includes not shown armature windings (that is, a U-phase winding, a V-phase winding, and a W-phase winding), respectively, for U, V, W-phases of the motor 60.

The rotation sensor 26 detects a rotational position (rotation angle) of the motor 60. The rotation sensor 26 includes not shown three Hall elements and a not shown Hall IC. The respective Hall elements may be associated with the U-phase winding, the V-phase winding, and the W-phase winding. The Hall IC detects a rotational position of a not shown rotor of the motor 60. In the first embodiment, the rotation sensor 26 generates a rotation detection signal every time the rotor rotates at a specified angle.

The controller 20 includes a control circuit 30 and the first connector 20a. The first connector 20a is configured to be alternately connected to the battery pack 70 or a first connection adapter 80 of a first diagnosis device 3. In other words, the first connector 20a cannot be concurrently connected to two or more external devices (in other words, both the battery pack 70 and the first diagnosis device 3), but can be connected to one external device (in other words, the battery pack 70 or the first diagnosis device 3).

The first connector 20*a* includes a first positive terminal 11, a first negative terminal 12, a first signal terminal 13, a first serial communication terminal 14A, and a second serial communication terminal 14B. The first positive terminal 11 and the first negative terminal 12 complete a power supply path from the battery pack 70 to the motor 60. The first signal terminal 13, the first serial communication terminal 14A, and the second serial communication terminal 14B complete communication paths between the control circuit 30 and the battery pack 70. Alternatively, the first signal terminal 13, the first serial communication terminal 14A, and the second serial communication terminal 14B complete communication paths between the control circuit 30 and the first diagnosis device 3. In response to the first connector 20*a* being connected to the first diagnosis device 3, a job-site electrical system 1, which corresponds to one example of the job-site electrical system of the present disclosure, is established.

Furthermore, the controller 20 includes a regulator 21, a battery voltage detector 22, the aforementioned trigger SW 23, a LED board 241, a current detection circuit 25, the control circuit 30, a gate circuit 40, a driving circuit 50, and a temperature sensor 27.

In response to the battery pack 70 being connected to the first tool main body 10, the regulator 21 is supplied with electric power from the battery pack 70. Based on the supplied electric power, the regulator 21 generates a power-supply voltage (for example, a direct-current of 5V). The power-supply voltage is applied to at least the control circuit 30.

The battery voltage detector 22 detects a voltage value (hereinafter, referred to as a battery voltage value) of the battery pack 70 that is applied between the first positive terminal 11 and the first negative terminal 12. The battery voltage detector 22 outputs an analog signal, which indicates the detected battery voltage value, to the control circuit 30.

The trigger SW 23 is manipulated by the user to drive or stop the motor 60. The trigger SW 23 is turned ON in response to the trigger 121 being pulled by the user, and outputs an ON signal to the control circuit 30. The trigger SW 23 is turned OFF in response to the trigger 121 being released from the user, and outputs an OFF signal to the control circuit 30.

Furthermore, the trigger SW 23 is manipulated by the user to adjust the rotational frequency of the motor 60 and the torque of the motor 60. The U-phase winding, the V-phase winding, and the W-phase winding of the motor 60 are applied with a pulse signal with a commanded duty ratio (that is, a pulse-width modulation (PWM) signal). The commanded duty ratio is designated by the control circuit 30. A target duty ratio is a target for the commanded duty ratio and is set in accordance with the pulling amount of the trigger 121. The user adjusts the pulling amount of the trigger 121 in accordance with a desired rotational frequency of the motor 60 and/or a desired torque of the motor 60. The user reduces the pulling amount of the trigger 121 if the user desires to reduce the rotational frequency of the motor 60 or to reduce the torque of the motor 60. Alternately, the user increases the pulling amount of the trigger 121 if the user desires to increase the rotational frequency of the motor 60 or to increase the torque of the motor 60.

In another embodiment, a switch and/or a dial may be provided in addition to the trigger 121 for the user to set an operation mode of the first tool main body 10 and a target duty ratio. Alternately, the target duty ratio may be set in accordance with the operation mode.

The LED board 241 is provided to the display panel 24 to notify the user of various information such as an operation state and a faulty state of the first tool main body 10. The LED board 241 includes two or more display LEDs 24*a* thereon. The LED board 241 turns on, blinks, and turns off the individual display LEDs 24*a* in accordance with a command from the control circuit 30 to notify the user of the various information. In the first embodiment, the display LEDs 24*a* display the operation mode of the electric powered work machine 2, the rotational frequency the motor 60, the rotation direction of the motor 60, and the remaining electric energy of the battery pack 70.

The LED board 241 outputs an analog signal, which indicates a value (hereinafter, referred to as a LED board current value) of an electric current flowing through the LED board 241, to the control circuit 30. This electric current corresponds to an electric current flowing through the display LEDs 24*a*.

The driving circuit 50 is configured to supply an electric current (hereinafter, referred to as a motor current) from the battery pack 70 to the U-phase winding, the V-phase winding, and the W-phase winding. More specifically, the driving circuit 50 includes a three-phase full-bridge circuit that includes a first to a sixth switching devices Q1 to Q6. The first to the third switching devices Q1 to Q3 function as high-side switches. The fourth to the sixth switching devices Q4 to Q6 function as low-side switches. The first to the sixth switching devices Q1 to Q6 of the first embodiment each are a metal oxide semiconductor field-effect transistor (MOSFET). However, the first to the sixth switching devices Q1 to Q6 each are not limited to the MOSFET and may be any switching device such as an insulated gate bipolar transistor (IGBT). The driving circuit 50 of the first embodiment is located inside the grip 103. In another embodiment, the driving circuit 50 may be located in any place other than the inside of the grip 103.

The temperature sensor 27 detects a temperature of the driving circuit 50. The temperature sensor 27 outputs an analog signal, which indicates the detected temperature, to the control circuit 30.

The gate circuit 40 individually turns on or off the first to the sixth switching devices Q1 to Q6 in accordance with control signals output from the control circuit 30 so that the U-phase winding, V-phase winding, and the W-phase winding are sequentially supplied with the motor current, whereby the motor 60 rotates. In response to all of the first to the sixth switching devices Q1 to Q6 being turned OFF during the rotation of the motor 60, the motor 60 rotates by inertia. During the rotation of the motor 60, in response to (i) all of the first to the third switching devices Q1 to Q3 being turned OFF and (ii) all of the fourth to the sixth switching devices Q4 to Q6 being turned ON, the motor 60 is applied with a so-called short-circuit brake.

The current detection circuit 25 is provided on a negative electrode line that leads to the first negative terminal 12 from the driving circuit 50. The current detection circuit 25 detects a value of the motor current (hereinafter, referred to as a motor current value) that is output from the battery pack 70 to the motor 60. The current detection circuit 25 outputs an analog signal, which indicates the detected motor current value, to the control circuit 30.

The control circuit 30 of the first embodiment is in the form of a microcomputer. Thus, the control circuit 30 includes a CPU 31 and a memory 32. The control circuit 30 may include, in replacement of or in addition to the microcomputer, a combination of electronic components such as discrete elements, an Application Specified Integrated Circuit (ASIC), an Application Specific Standard Product (ASSP), a programmable logic device such as a Field Programmable Gate Array (FPGA), or a combination of these.

The memory 32 is in the form of a semiconductor memory that includes a volatile memory and/or a non-volatile memory. The CPU 31 executes various processes by executing various programs stored in the memory 32.

The battery pack 70 may be chargeable. The battery pack 70 includes a battery block 78, a control circuit 75, and a pack connector 70a. In another embodiment, the battery pack 70 may include one or more additional battery block(s) that is/are connected to the battery block 78 in series or in parallel. The pack connector 70a includes a battery positive terminal 71, a battery negative terminal 72, a battery signal terminal 73, a first battery communication terminal 74A, and a second battery communication terminal 74B.

The pack connector 70a is configured to be connected to the first connector 20a. In response to the battery pack 70 being connected to the first tool main body 10, the battery positive terminal 71, the battery negative terminal 72, the battery signal terminal 73, the first battery communication terminal 74A, and the second battery communication terminal 74B, respectively, are connected to the first positive terminal 11, the first negative terminal 12, the first signal terminal 13, the first serial communication terminal 14A, and the second serial communication terminal 14B.

The battery block 78 includes one or more rechargeable battery(s) (in other words, a cell(s)) such as a lithium-ion battery. In another embodiment, the battery block 78 may include a non-rechargeable battery. The battery block 78 includes two or more battery cells that are connected in series. The battery block 78 includes a positive electrode that is connected to the battery positive terminal 71. The battery block 78 includes a negative electrode that is connected to the battery negative terminal 72.

The control circuit 75 of the first embodiment is in the form of a microcomputer. Thus, the control circuit 75 includes a CPU 76 and a memory 77. The control circuit 75 may include, in replacement of or in addition to the microcomputer, a combination of electronic components such as discrete elements, an ASIC, an ASSP, a programmable logic device such as a FPGA, or a combination of these.

The memory 77 is in the form of a semiconductor memory that includes a volatile memory and/or a non-volatile memory. The CPU 76 executes various processes by executing various programs stored in the memory 77. Specifically, if the battery block 78 is dischargeable, then the control circuit 75 outputs a discharge permission signal to the first tool main body 10 via the battery signal terminal 73. Furthermore, if the battery block 78 is non-dischargeable, then the control circuit 75 outputs a discharge prohibition signal to the first tool main body 10 via the battery signal terminal 73. The discharge permission signal is, for example, a signal that has a low logic level. The discharge prohibition signal is, for example, a signal that has a high logic level.

Furthermore, the control circuit 75 executes a full duplex serial communication with the first tool main body 10 via the first battery communication terminal 74A and the second battery communication terminal 74B. Specifically, the control circuit 75 transmits information on the battery pack 70 (that is, a signal in a serial format) to the first tool main body 10 via the first battery communication terminal 74A, while receiving information on the first tool main body 10 from the first tool main body 10 via the second battery communication terminal 74B.

The first diagnosis device 3 executes a failure diagnosis of the electric powered work machine 2. The first diagnosis device 3 includes a first connection adapter 80, a first calculator 90, and a device power source 91.

The first connection adapter 80 is connected to the first calculator 90 and to the device power source 91. The first connection adapter 80 is configured to be detachably connected, in replacement of the battery pack 70, to the first connector 20a of the first tool main body 10.

Thus, the first calculator 90 is connected to the first tool main body 10 via the first connection adapter 80. The device power source 91 supplies electric power to the first tool main body 10 via the first connection adapter 80.

The first connection adapter 80 includes an adapter positive terminal 81, an adapter negative terminal 82, an adapter signal terminal 83, a first adapter communication terminal 84A, and a second adapter communication terminal 84B.

In response to the first connection adapter 80 being connected to the first tool main body 10, the adapter positive terminal 81, the adapter negative terminal 82, the adapter signal terminal 83, the first adapter communication terminal 84A, and the second adapter communication terminal 84B, respectively, are connected to the first positive terminal 11, the first negative terminal 12, the first signal terminal 13, the first serial communication terminal 14A, and the second serial communication terminal 14B.

The device power source 91 generates and outputs a direct voltage based on an alternating voltage supplied from an AC power source such as a commercial power source. A positive electrode of the device power source 91 is connected to the adapter positive terminal 81. A negative electrode of the device power source 91 is connected to the adapter negative terminal 82. In response to the first connection adapter 80 being connected the first tool main body 10, the device power source 91 outputs the direct voltage to the first tool main body 10 via the adapter positive terminal 81 and the adapter negative terminal 82.

The first calculator 90 is connected to the adapter signal terminal 83, the first adapter communication terminal 84A, and the second adapter communication terminal 84B. As the first connection adapter 80 is connected to the first tool main body 10, the first calculator 90 is connected to the first tool main body 10 via the adapter signal terminal 83, the first adapter communication terminal 84A, and the second adapter communication terminal 84B. Consequently, the first calculator 90 can transmit various information to the first tool main body 10 or receive various information from the first tool main body 10.

The first calculator 90 includes a controller 90a. The controller 90a of the first embodiment is in the form of a microcomputer. Thus, the controller 90a includes a CPU and a memory, which are not shown. In the controller 90a, the CPU executes various programs stored in the memory, to thereby execute various processes. The controller 90a may include, in replacement of or in addition to the microcomputer, a combination of electronic components such as discrete elements, an ASIC, an ASSP, a programmable logic device such as FPGA, or a combination of these.

The first calculator 90 further includes a command inputter 90b. The command inputter 90b is a device for the user to input a command to the first calculator 90. The first calculator 90 may be, for example, a mobile terminal device such as a laptop computer. The command inputter 90b may be, for example, a keyboard.

In the first calculator 90, in response to the user inputting various commands via the command inputter 90b, the controller 90a executes a process in accordance with the input command. The first calculator 90 executes a diagnosis command process in response to, for example, the user inputting a diagnosis execution command. In the diagnosis command process, the first calculator 90 transmits a diagnosis command signal to the first tool main body 10 and receives a diagnosis result signal from the first tool main body 10.

[1-3. Main Routine]

Figure 3:
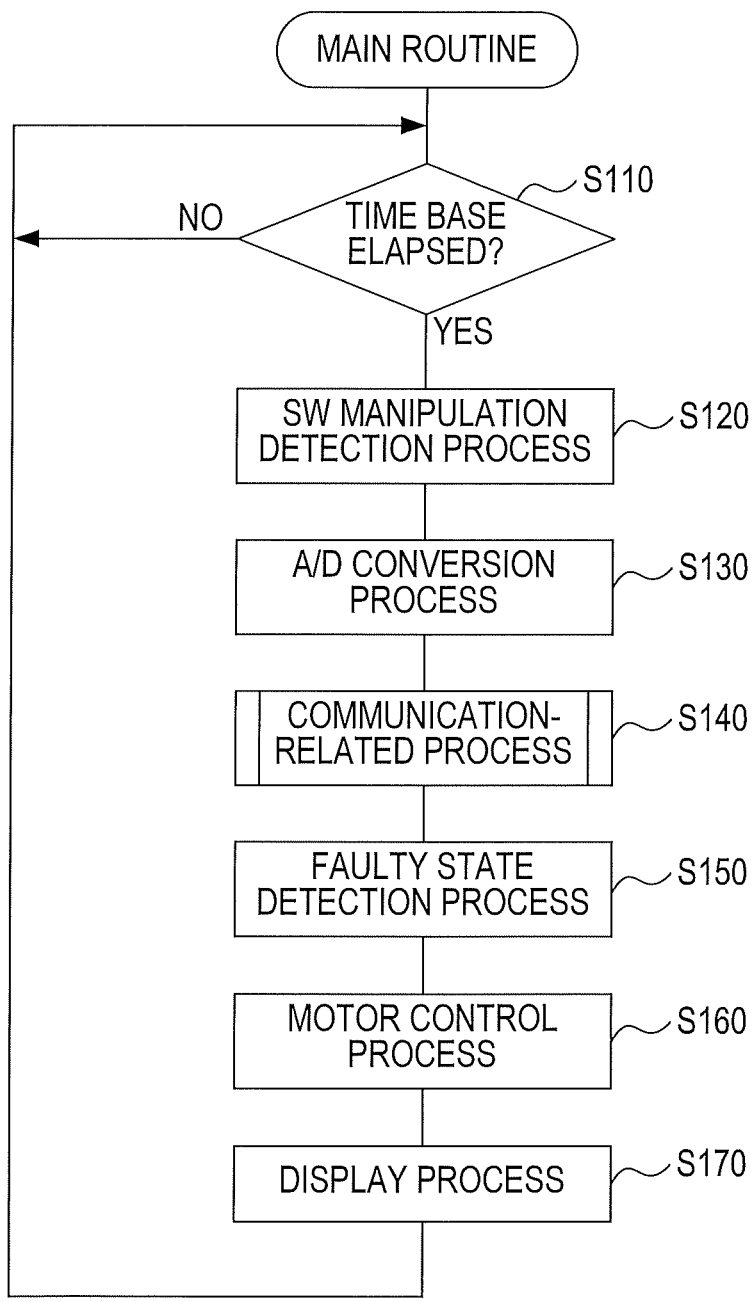
FIG. 3 is a flowchart showing a main routine of the first embodiment.

With reference to FIG. 3, descriptions are given to a main routine that is executed by the control circuit 30.

As shown in FIG. 3, the control circuit 30 first determines, in S110, whether a timebase has elapsed. The timebase corresponds to a control cycle of the control circuit 30. If the timebase has not elapsed (S110: NO), then the control circuit 30 waits for the timebase to elapse. In response to the timebase elapsing (S110: YES), the control circuit 30 proceeds to S120.

In S120, the control circuit 30 executes a switch (SW) manipulation detection process. Specifically, the control circuit 30 detects whether the trigger SW 23 is placed in an ON-state or an OFF-state based on the ON signal or the OFF signal input from the trigger SW 23. In response to completion of the SW manipulation detection process, the control circuit 30 proceeds to S130.

In S130, the control circuit 30 executes an analog/digital (A/D) conversion process. Specifically, the control circuit 30 converts the above respective analog signals, which are input from the LED board 241, the battery voltage detector 22, the current detection circuit 25, and the temperature sensor 27, into digital values. Through this conversion, the control circuit 30 acquires respective digital values of the LED board current value, the motor current value, the battery voltage value, and the temperature of the driving circuit 50. In response to completion of the A/D conversion process, the control circuit 30 proceeds to S140.

In S140, the control circuit 30 executes a communication-related process. Specifically, the control circuit 30 establishes a serial communication with an external device, which is connected to the control circuit 30 via the first serial communication terminal 14A and the second serial communication terminal 14B. The control circuit 30 determines the type of the external device, and transmits various information to the external device and/or receives various information from the external device. In the first embodiment, the battery pack 70 and the first diagnosis device 3 correspond to the external device. In response to completion of the communication-related process, the control circuit 30 proceeds to S150.

In S150, the control circuit 30 executes a faulty state detection process. Specifically, the control circuit 30 compares the motor current value, the battery voltage value, and the temperature of the driving circuit 50, which have been acquired in S130, with respective threshold values, and detects a faulty state that includes an overcurrent to the motor 60, voltage drop in the battery pack 70, and an overheat of the driving circuit 50. In response to completion of the faulty state detection process, the control circuit 30 proceeds to S160.

In S160, the control circuit 30 executes a motor control process based on a state of the trigger SW 23, a state of the battery pack 70, and the detection of the faulty state. The control circuit 30 drives the motor 60 in response to a specified driving condition being fulfilled. The driving condition is fulfilled in a case where (i) the trigger SW 23 is placed in the ON-state, (ii) no faulty state has been detected in S150, and (iii) a discharge permission flag is set. The discharge permission flag is set in response to the control circuit 30 receiving the discharge permission signal from the control circuit 75. The discharge permission flag is reset in response to the control circuit 30 receiving the discharge prohibition signal from the control circuit 75. In S160, the control circuit 30 may detect the rotational position of the rotor of the motor 60 based on the above-described rotation detection signal generated by the rotation sensor 26. Furthermore, the control circuit 30 may calculate the rotational frequency (or a rotation speed) of the motor 60 based on the rotational position of the rotor and a detection interval between rotational positions of the rotor. The rotational frequency corresponds to the number of rotations per unit time (for example, 1 minute). In response to completion of the motor control process, the control circuit 30 proceeds to S170.

In S170, the control circuit 30 executes a display process. Specifically, the control circuit 30 notifies the user of an operation state of the motor 60, a remaining electric energy in the battery pack 70, and the detected faulty state via the display panel 24 (more specifically, the display LEDs 24a). In response to completion of the display process, the control circuit 30 returns to S110.

[1-4. Communication-Related Process]

Figure 4:
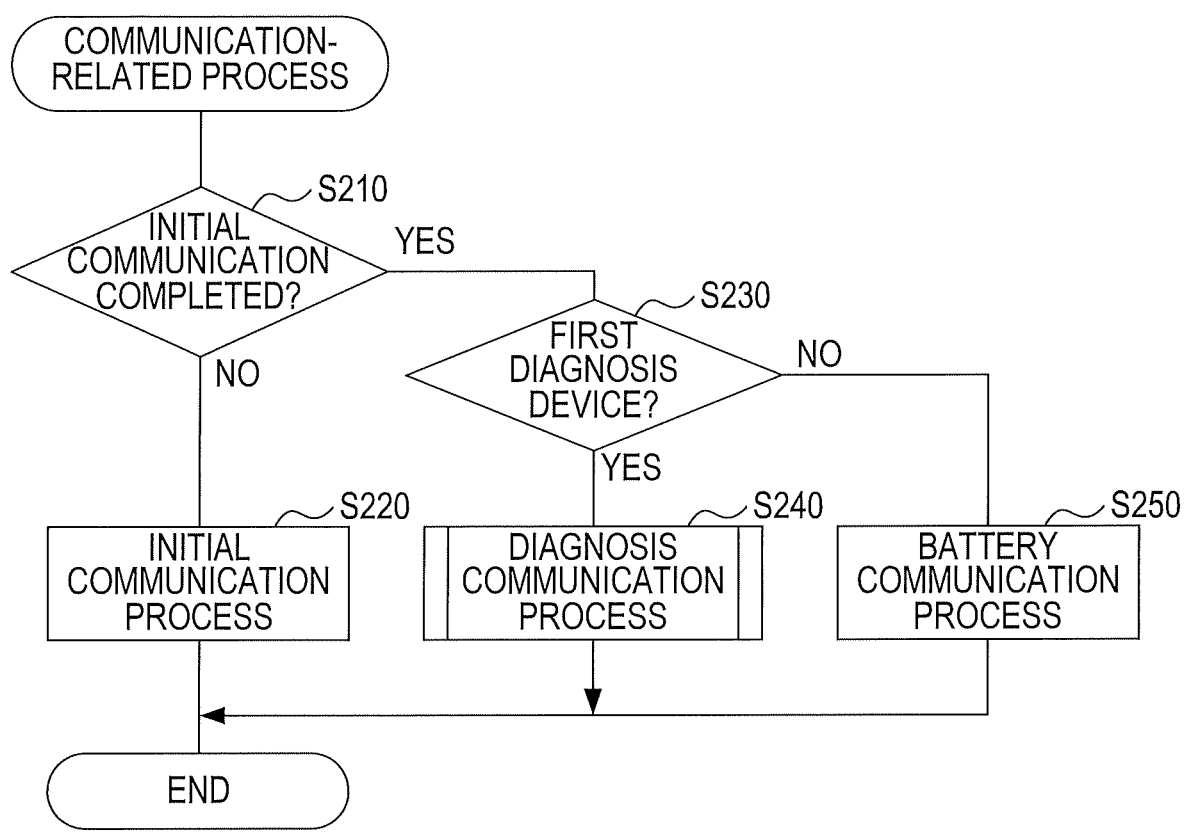
FIG. 4 is a flowchart showing a communication-related process of the first embodiment.

With reference to FIG. 4, descriptions are given to details of the above-described communication-related process.

As shown in FIG. 4, the control circuit 30 first determines, in S210, whether an initial communication has completed. If the initial communication has completed (S210: YES), then the control circuit 30 proceeds to S230. If the initial communication has not completed (S210: NO), then the control circuit 30 proceeds to S220.

In S220, the control circuit 30 executes an initial communication process. Specifically, in response to the external device being connected to the first tool main body 10, the control circuit 30 establishes the serial communication with the external device via the first serial communication terminal 14A and the second serial communication terminal 14B. The control circuit 30 determines the type of the external device based on information received from the external device and completes the initial communication process.

In S230, the control circuit 30 determines whether the external device is the first diagnosis device 3 (in other words, the control circuit 30 identifies the external device). If the external device is the first diagnosis device 3 (S230: YES), then the control circuit 30 proceeds to S240. If the external device is not the first diagnosis device 3 (S230: NO), then the control circuit 30 proceeds to S250.

In S240, the control circuit 30 executes a diagnosis communication process. The diagnosis communication process will be described later in details.

In S250, the control circuit 30 executes a battery communication process. The control circuit 30 communicates with the battery pack 70, which is connected to the first connector 20a. This communication includes transmission and/or reception of a battery-related signal.

More specifically, in the battery communication process, the control circuit 30 first executes an initial information acquisition process. In the initial information acquisition process, the control circuit 30 first transmits information, such as a model number of the first tool main body 10, to the battery pack 70 via the first serial communication terminal 14A. Furthermore, the control circuit 30 receives information, such as an inner resistance information and the model number of the battery pack 70, from the battery pack 70 via the second serial communication terminal 14B. The inner resistance information may indicate an internal resistance value of the battery pack 70. Alternately/additionally, the inner resistance information may indicate the number of cells that are coupled in parallel in the battery block 78. That is, the inner resistance information may be the internal resistance value itself or any information available to calculate or estimate the internal resistance value.

In response to completion of the initial information acquisition process, the control circuit 30 executes a continuous information acquisition process. In the continuous information acquisition process, the control circuit 30 receives respective values of the temperature, the remaining electric energy, and an overload counter of the battery pack 70 via the second serial communication terminal 14B.

In response to completion of the processes in S220, S240, and S250, the control circuit 30 ends the communication-related process.

[1-5. Diagnosis Communication Process]

Figure 5:
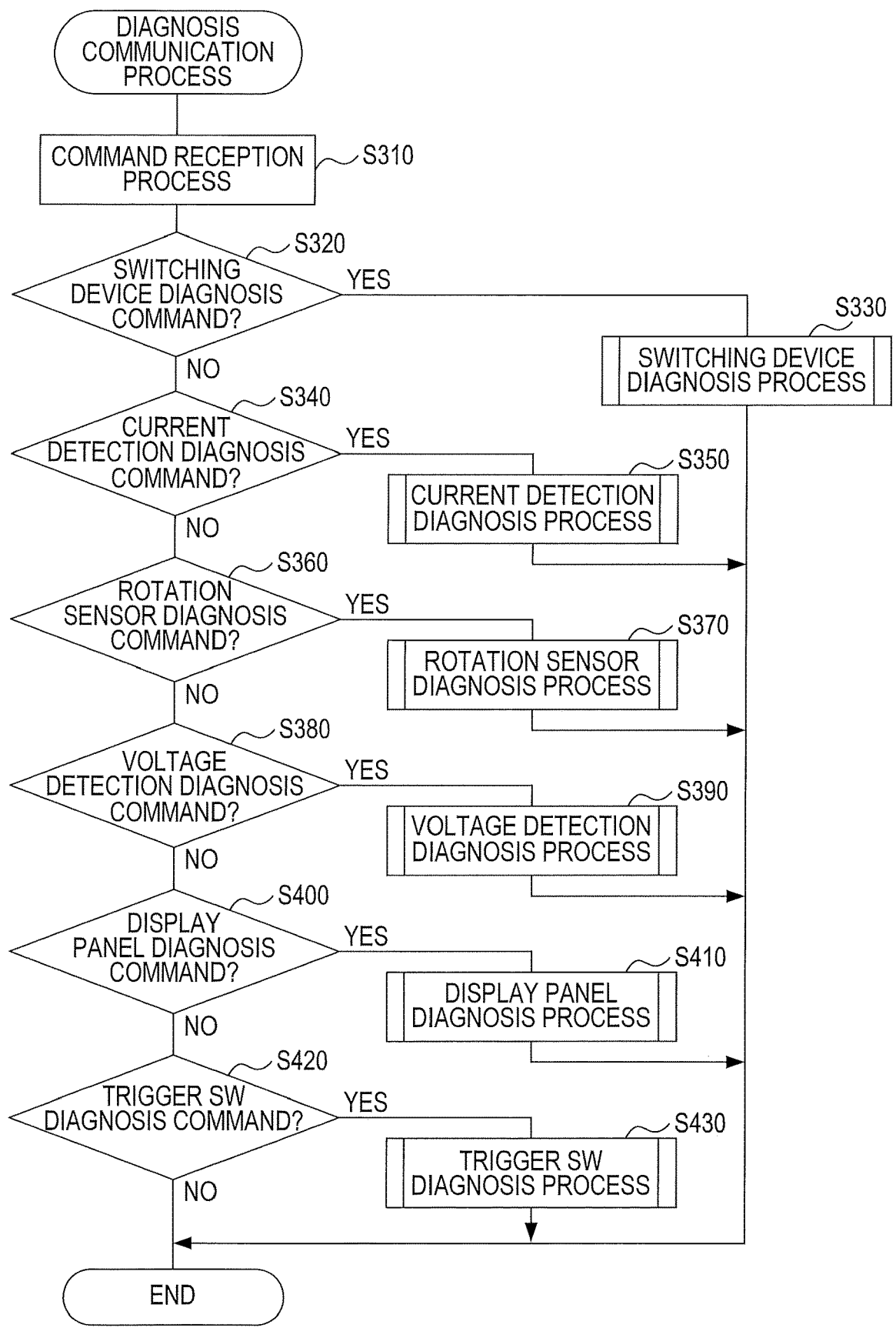
FIG. 5 is a flowchart showing a diagnosis communication process of the first embodiment.

With reference to FIG. 5, descriptions are given to details of the above-described diagnosis communication process.

First, in S310, the control circuit 30 executes a command reception process to receive the diagnosis command signal from the first diagnosis device 3 via the second serial communication terminal 14B. The diagnosis command signal may include a single diagnosis command, or two or more diagnosis commands. The diagnosis command signal of the first embodiment includes one of a switching device diagnosis command, a current detection diagnosis command, a rotation sensor diagnosis command, a voltage detection diagnosis command, a display panel diagnosis command, or a trigger SW diagnosis command.

Subsequently, in S320, the control circuit 30 determines whether the switching device diagnosis command has been received based on the received diagnosis command signal. If the switching device diagnosis command has been received (S320: YES), then the control circuit 30 proceeds to S330. If the switching device diagnosis command has not been received (S320: NO), then the control circuit 30 proceeds to S340.

In S330, the control circuit 30 executes a switching device diagnosis process, which will be described later, to diagnose each of the first to the sixth switching devices Q1 to Q6.

In S340, the control circuit 30 determines whether the current detection diagnosis command has been received based on the received diagnosis command signal. If the current detection diagnosis command has been received (S340: YES), then the control circuit 30 proceeds to S350. If the current detection diagnosis command has not been received (S340: NO), then the control circuit 30 proceeds to S360.

In S350, the control circuit 30 executes a current detection diagnosis process, which will be described later, to perform a fault diagnosis on the current detection circuit 25.

In S360, the control circuit 30 determines whether the rotation sensor diagnosis command has been received based on the received diagnosis command signal. If the rotation sensor diagnosis command has been received (S360: YES), then the control circuit 30 proceeds to S370. If the rotation sensor diagnosis command has not been received (S360: NO), then the control circuit 30 proceeds to S380.

In S370, the control circuit 30 executes a rotation sensor diagnosis process, which will be described later, to perform a fault diagnosis on the rotation sensor 26.

In S380, the control circuit 30 determines whether the voltage detection diagnosis command has been received based on the received diagnosis command signal. If the voltage detection diagnosis command has been received (S380: YES), then the control circuit 30 proceeds to S390. If the voltage detection diagnosis command has not been received (S380: NO), then the control circuit 30 proceeds to S400.

In S390, the control circuit 30 executes a voltage detection diagnosis process, which will be described later, to perform a fault diagnosis on the battery voltage detector 22.

In S400, the control circuit 30 determines whether a display panel diagnosis command has been received based on the received diagnosis command signal. If the display panel diagnosis command has been received (S400: YES), then the control circuit 30 proceeds to S410. If the display panel diagnosis command has not been received (S400: NO), then the control circuit 30 proceeds to S420.

In S410, the control circuit 30 executes a display panel diagnosis process, which will be described later, to perform a fault diagnosis on the display LEDs 24a.

In S420, the control circuit 30 determines whether the trigger SW diagnosis command has been received based on the received diagnosis command signal. If the trigger SW diagnosis command has been received (S420: YES), then the control circuit 30 proceeds to S430. If the trigger SW diagnosis command has not been received (S420: NO), then the control circuit 30 ends the diagnosis communication process.

In S430, the control circuit 30 executes a trigger SW diagnosis process, which will be described later, to perform a fault diagnosis on the trigger SW 23.

In response to completion of S330, S350, S370, S390, S410, or S430, the control circuit 30 ends the diagnosis communication process.

[1-6. Switching Device Diagnosis Process]

Figure 6:
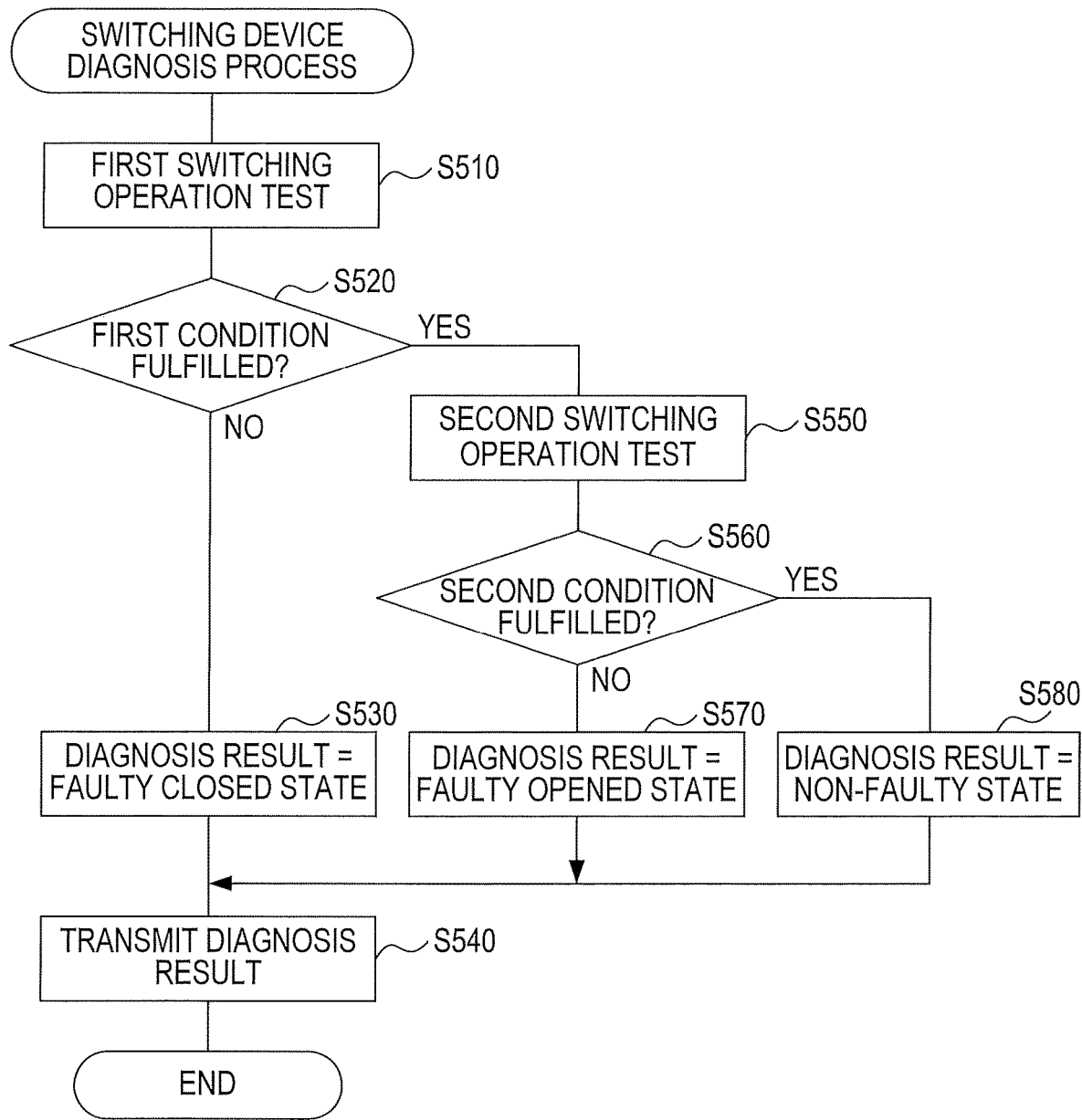
FIG. 6 is a flowchart showing a switching device diagnosis process of the first embodiment.

With reference to FIG. 6, descriptions are given to details of the above-described switching device diagnosis process.

First, in S510, the control circuit 30 performs a first switching operation test. In the first switching operation test, the control circuit 30 individually turns ON the first to the sixth switching devices Q1 to Q6 in sequence to determine whether an electric current flows through the driving circuit 50. The control circuit 30 stores, in the memory 32, determination results with respect to respective ON operations of the first to the sixth switching devices Q1 to Q6.

Subsequently, in S520, the control circuit 30 determines whether a first condition is fulfilled with respect to the results of the first switching operation test. The first condition is fulfilled in response to the electric current being undetected on all the ON operations of the first to the sixth switching devices Q1 to Q6. In other words, the first condition is unfulfilled if the electric current is detected on at least one of the ON operations of the first to the sixth switching devices Q1 to Q6. If the first condition is fulfilled (S520: YES), then the control circuit 30 proceeds to S550. If the first condition is unfulfilled (S520: NO), then the control circuit 30 proceeds to S530.

In S530, the control circuit 30 determines the diagnosis result for the first to the sixth switching devices Q1 to Q6 as a "faulty closed state". The "faulty closed state" is also referred to as a short-circuit fault. In other words, in the "faulty closed state", at least one of the first to the sixth switching devices Q1 to Q6 is short-circuited between the drain and the source thereof and consequently, the drain and the source are disconnected therebetween. If all of the first to the sixth switching devices Q1 to Q6 are in a non-faulty state, then the first condition is fulfilled regarding the first switching operation test. However, if at least one of the first to the sixth switching devices Q1 to Q6 is closed in a fault manner, then the first condition is unfulfilled.

In S550, the control circuit 30 performs a second switching operation test. In the second switching operation test, the first to the sixth switching devices Q1 to Q6 are turned ON, two by two in sequence, and a determination is made whether the electric current flows through the driving circuit 50. More specifically, the control circuit 30 turns ON the first to the sixth switching devices Q1 to Q6 in accordance with the following predetermined first to sixth combinations:

First combination: the first switching device Q1 and the fifth switching device Q5;
Second combination: the first switching device Q1 and the sixth switching device Q6;
Third combination: the second switching device Q2 and the fourth switching device Q4;
Fourth combination: the second switching device Q2 and the sixth switching device Q6;
Fifth combination: the third switching device Q3 and the fourth switching device Q4;
Sixth combination: the third switching device Q3 and the fifth switching device Q5.

If the current detection circuit 25 detects the electric current in all of the first to the sixth combinations, then the control circuit 30 determines that the electric current has flowed through the driving circuit 50. If the current detection circuit 25 does not detect the electric current in one of the first to the sixth combinations, then the control circuit 30 determines that the electric current has not flowed through the driving circuit 50. The control circuit 30 stores, in the memory 32, determination results with respect to respective ON operations of the first to the sixth combinations.

Subsequently, in S560, the control circuit 30 determines whether a second condition is fulfilled regarding results of the second switching operation test. The second condition is fulfilled in response to the current detection circuit 25 detecting the electric current in all the ON operations of the first to the sixth combinations. In other words, the second condition is unfulfilled if the electric current is undetected in at least one of the ON operations of the first to the sixth combinations. If the second condition is fulfilled (S560: YES), then the control circuit 30 proceeds to S580. If the second condition is unfulfilled (S560: NO), then the control circuit 30 proceeds to S570.

In S570, the control circuit 30 determines the diagnosis result for the first to the sixth switching devices Q1 to Q6 as a "faulty opened state". In the "faulty opened state", the drain and the source are disconnected (for example, burned out) therebetween in one of the first to the sixth switching devices Q1 to Q6 and consequently, the drain and the source are never connected again therebetween. If all of the first to the sixth switching devices Q1 to Q6 are in the non-faulty state, then the second condition is fulfilled regarding the results of the second switching operation test. However, if at least one of the first to the sixth switching devices Q1 to Q6 is placed in the faulty opened state, then the second condition is unfulfilled.

In S580, the control circuit 30 determines the diagnosis result for the first to the sixth switching devices Q1 to Q6 as "non-faulty state".

In response to completion of one of S530, S570, or S580, the control circuit 30 proceeds to S540.

In S540, the control circuit 30 transmits the diagnosis result for the first to the sixth switching devices Q1 to Q6 to the first diagnosis device 3 via the first serial communication terminal 14A. In response to completion of the process in S540, the control circuit 30 ends the switching device diagnosis process.

[1-7. Current Detection Diagnosis Process]

Figure 7:
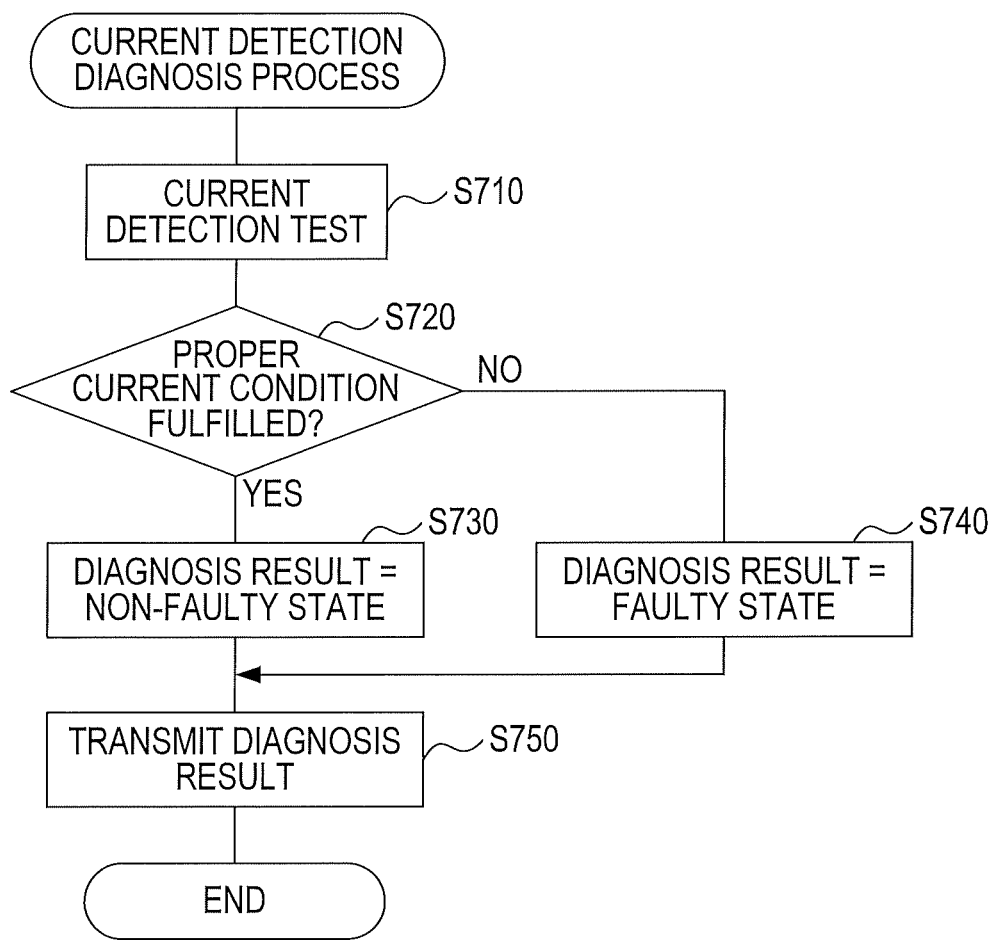
FIG. 7 is a flowchart showing a current detection diagnosis process of the first embodiment.

With reference to FIG. 7, descriptions are given to details of the above-described current detection diagnosis process.

First, in S710, the control circuit 30 performs a current detection test. In the current detection test, the control circuit 30 controls the driving circuit 50 so that a predefined diagnosis current flows through the motor 60, and detects a magnitude of the actual electric current flowed through the driving circuit 50. More specifically, the control circuit 30 turns ON specified two switching devices among the first to the sixth switching devices Q1 to Q6 for a predefined ON time to supply the electric current to the motor 60. In response to the specified two switching devices being turned ON, the control circuit 30 stores, in the memory 32, a current value detected in the current detection circuit 25.

Immediately after the specified two switching devices are turned ON, the motor 60 rotates. Then, as supply of the electric current to the motor 60 via the two switching devices continues, rotation of the motor 60 stops, which defines the rotational position of the motor 60. The electric current, which flows through the motor 60 and the driving circuit 50 under such circumstances, has a specified value that is defined based on the battery voltage value, an impedance of the driving circuit 50, an impedance of the motor 60 during its stoppage, the ON time (duty ratio) of the specified two switching-devices, or the like.

Thus, it is possible to determine whether the current detection circuit 25 is in a non-faulty state if a condition in the current detection test is predefined and, a proper magnitude range (hereinafter, referred to as a proper current range) of the electric current to be detected in the current detection circuit 25 is predefined in the predefined condition. The proper current range can be defined based on a magnitude of the electric current that is measured in advance using the electric powered work machine 2. The proper current range may include a specified error. The condition in the current detection test may include, for example, the battery voltage value and the ON time (duty ratio) of the first to the sixth switching devices Q1 to Q6.

Subsequently, in S720, the control circuit 30 determines whether a proper current condition is fulfilled regarding a result of the current detection test. The proper current condition is fulfilled in response to the current value, which has been detected in the current detection test, falling within the proper current range. If the proper current condition is fulfilled regarding the result of the current detection test (S720: YES), then the control circuit 30 proceeds to S730. If the proper current condition is unfulfilled (S720: NO), then the control circuit 30 proceeds to S740.

In S730, the control circuit 30 determines a diagnosis result for the current detection circuit 25 as "non-faulty state". In S740, the control circuit 30 determines the diagnosis result for the current detection circuit 25 as "faulty state".

In subsequent S750, the control circuit 30 transmits the diagnosis result to the first diagnosis device 3 and ends the current detection diagnosis process.

[1-8. Rotation Sensor Diagnosis Process]

Figure 8:
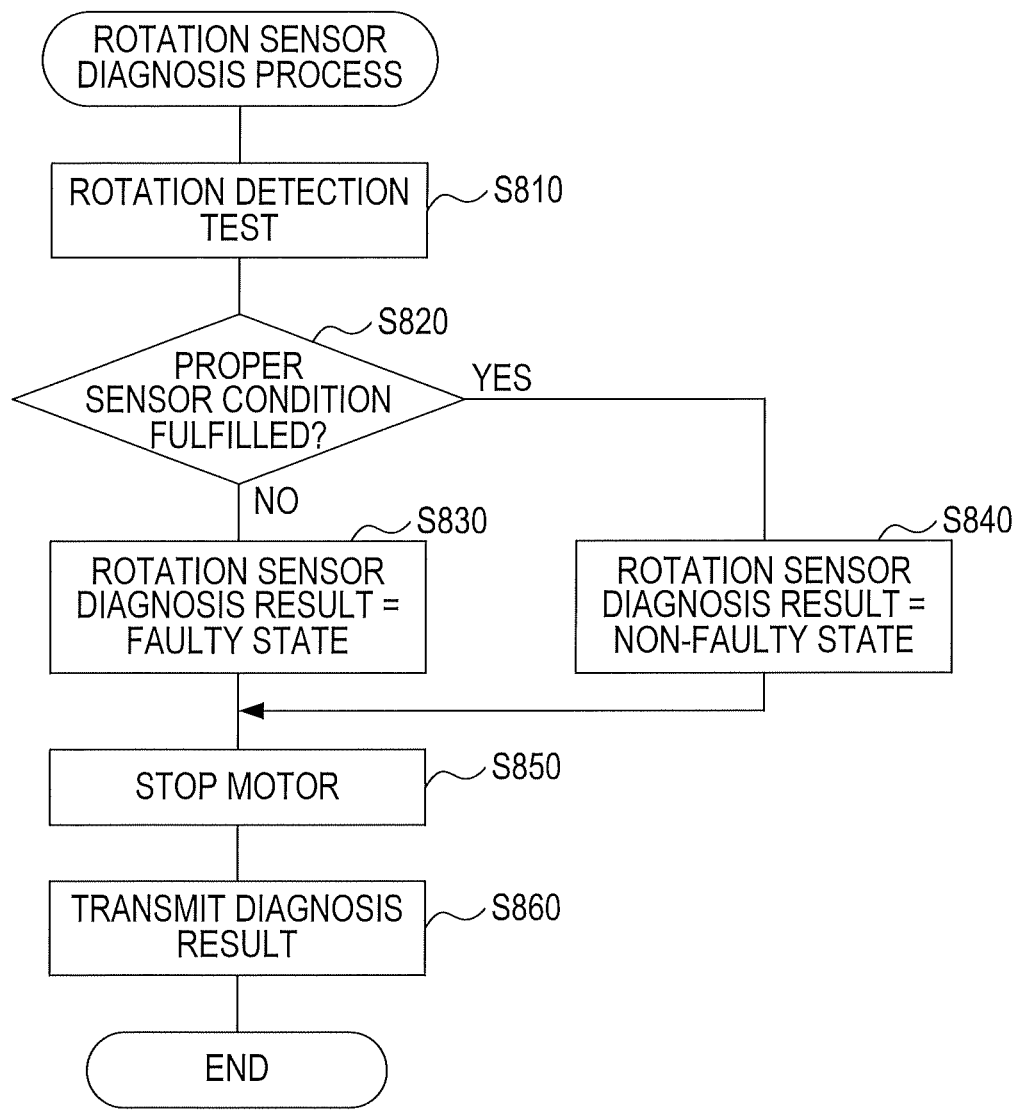
FIG. 8 is a flowchart showing a rotation sensor diagnosis process of the first embodiment.

With reference to FIG. 8, descriptions are given to details of the above-described rotation sensor diagnosis process.

First, in S810, the control circuit 30 performs a rotation detection test. In the rotation detection test, the control circuit 30 controls the driving circuit 50 such that the motor 60 rotates at a predefined rotational speed for diagnosis of the rotation sensor 26 (hereinafter, referred to as a diagnosis rotational speed). In accordance with the rotation of the motor 60, the control circuit 30 stores, in the memory 32, a detection result of the rotation sensor 26. The diagnosis rotational speed may be, for example, a low rotational speed such as 10 [rpm] so as to provide the user with safety.

Subsequently, in S820, the control circuit 30 determines whether a proper sensor condition is fulfilled regarding a result of the rotation detection test. The proper sensor condition is fulfilled in response to the detection result of the rotation sensor 26 coinciding with (or corresponding to) a rotational motion of the motor 60 at the diagnosis rotational speed. If the proper sensor condition is fulfilled regarding the result of the rotation detection test (S820: YES), then the control circuit 30 proceeds to S840. If the proper sensor condition is unfulfilled (S820: NO), the control circuit 30 proceeds to S830.

The proper sensor condition may be defined based on a variation pattern of the above-described rotation detection signal. Alternately, the proper sensor condition may be determined by a rotational speed calculated based on the detection result of the rotation sensor 26.

In S830, the control circuit 30 determines a diagnosis result for the rotation sensor 26 as "faulty state". In S840, the control circuit 30 determines the diagnosis result for the rotation sensor 26 as "non-faulty state"

In subsequent S850, the control circuit 30 controls the driving circuit 50 to stop the motor 60. In S860, the control circuit 30 transmits the diagnosis result for the rotation sensor 26 to the first diagnosis device 3 to end the rotation sensor diagnosis process.

[1-9. Voltage Detection Diagnosis Process]

Figure 9:
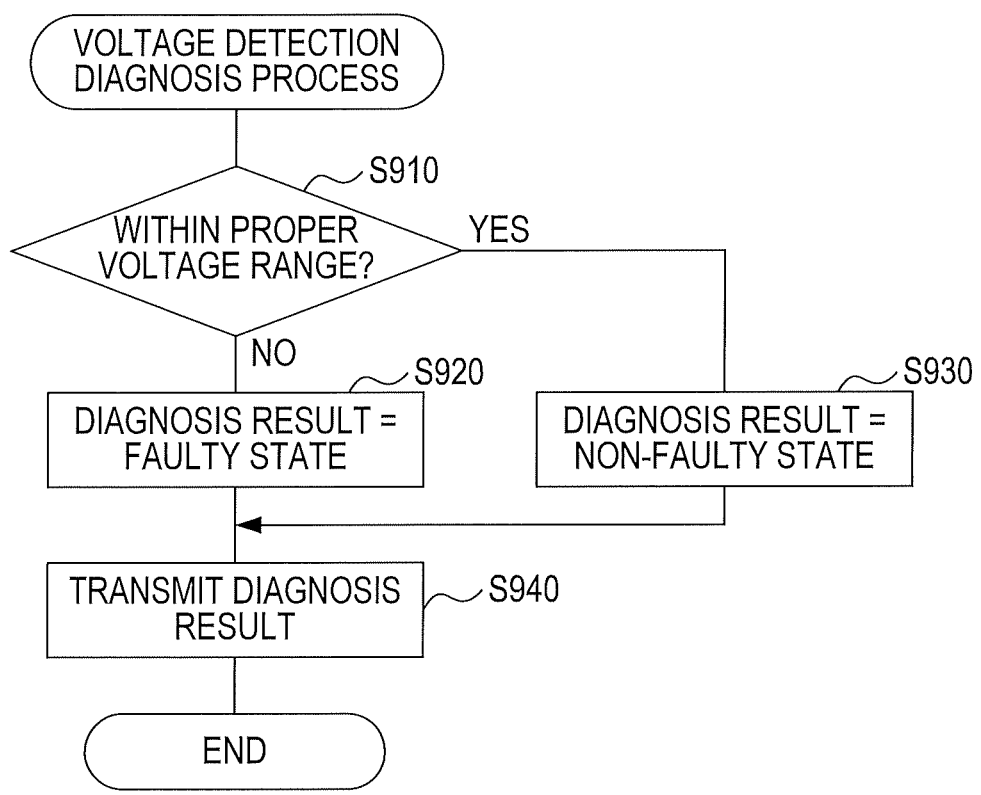
FIG. 9 is a flowchart showing a voltage detection diagnosis process of the first embodiment.

With reference to FIG. 9, descriptions are given to details of the above-described voltage detection diagnosis process.

First, in S910, the control circuit 30 determines whether the voltage value, which has been detected in the battery voltage detector 22, falls within a predefined proper voltage range. The proper voltage range is predefined based on an output voltage of the device power source 91. For example, in a case where the output voltage of the device power source 91 is 18 [V], the proper voltage range may be set to a range from 17 to 19 [V]. If the detected voltage value falls within the proper voltage range (S910: YES), then the control circuit 30 proceeds to S930. If the detected voltage value does not fall within the proper voltage range (S910: NO), then the control circuit 30 proceeds to S920.

In S920, the control circuit 30 determines the diagnosis result for the battery voltage detector 22 as "faulty state". In S930, the control circuit 30 determines the diagnosis result for the battery voltage detector 22 as "non-faulty state".

Subsequently, in S940, the control circuit 30 transmits the diagnosis result to the first diagnosis device 3 to end the voltage detection diagnosis process.

[1-10. Display Panel Diagnosis Process]

Figure 10:
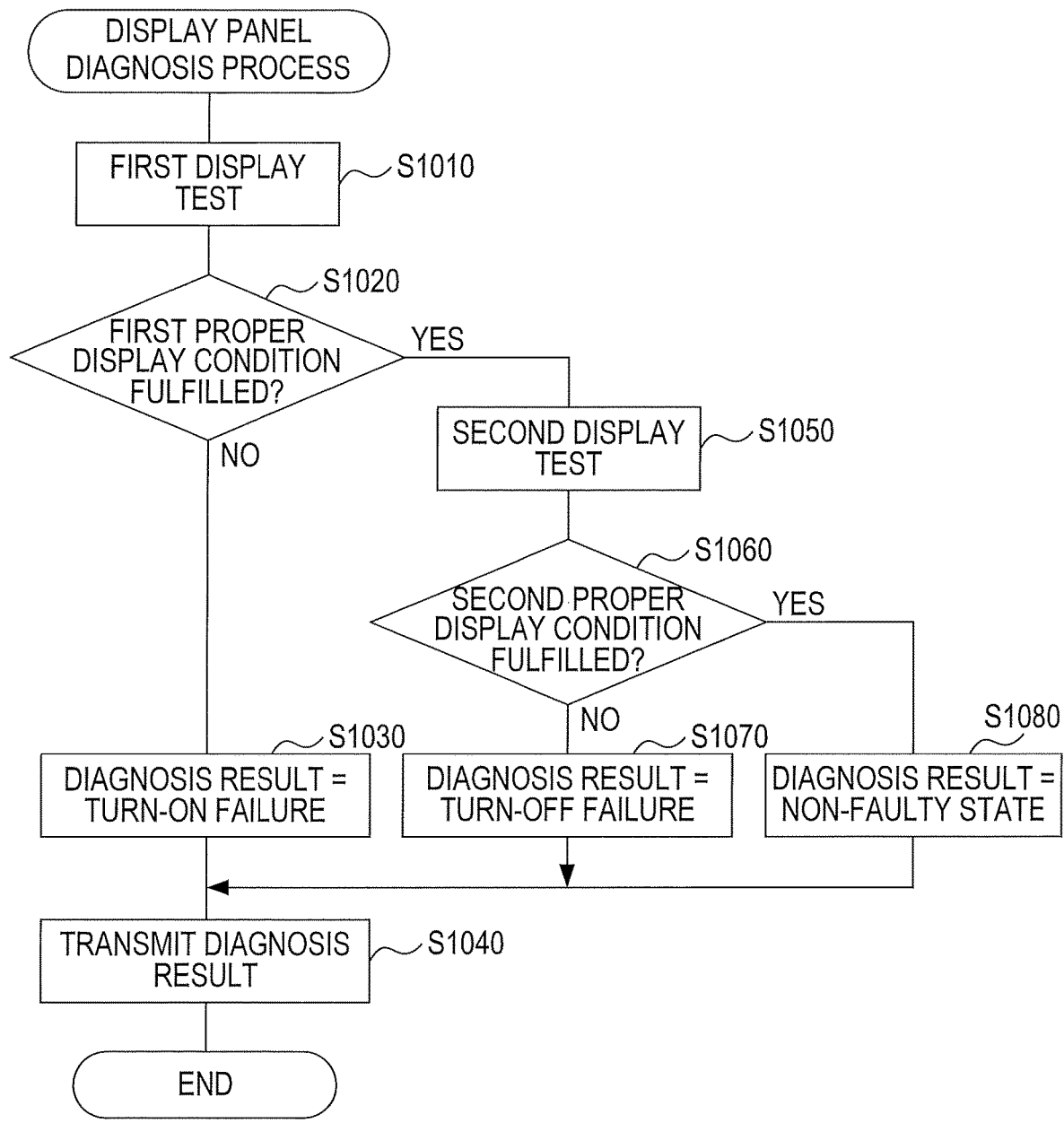
FIG. 10 is a flowchart showing a display panel diagnosis process of the first embodiment.

With reference to FIG. 10, descriptions are given to details of the above-described display panel diagnosis process.

First, in S1010, the control circuit 30 performs a first display test. In the first display test, the control circuit 30 controls the display LEDs 24a so that the display panel 24 is set in a predefined first display state, to thereby detect the LED board current value. In the first display state of the first embodiment, all the display LEDs 24a are turned on.

Subsequently, in S1020, the control circuit 30 determines whether a first proper display condition is fulfilled regarding a result of the first display test. The first proper display condition is fulfilled in response to the LED board current value falling within a first proper display current range. The first proper display current range is predefined based on the LED board current value as all the display LEDs 24a are turned on. If the first proper display condition is fulfilled regarding the result of the first display test (S1020: YES), then the control circuit 30 proceeds to S1050. If the first proper display condition is unfulfilled (S1020: NO), then the control circuit 30 proceeds to S1030.

In S1050, the control circuit 30 performs a second display test. In the second display test, the control circuit 30 controls the display LEDs 24a so that the display panel 24 is set in a predefined second display state, to thereby detect the LED board current value. In the second display state of the first embodiment, all the display LEDs 24a are turned off.

Subsequently, in S1060, the control circuit 30 determines whether a second proper display condition is fulfilled regarding a result of the second display test. The second proper display condition is fulfilled in response to the LED board current value falling within a second proper display current range. The second proper display current range is predefined based on the LED board current value as the display LEDs 24a are turned off. If the second proper display condition is fulfilled (S1060: YES), then the control circuit 30 proceeds to S1080. If the second proper display condition is unfulfilled (S1060: NO), then the control circuit 30 proceeds to S1070.

In S1030, the control circuit 30 determines a diagnosis result for the display panel 24 as "turn-on failure" and proceeds to S1040. In S1070, the control circuit 30 determines the diagnosis result for the display panel 24 as "turn-off failure" and proceeds to S1040. In S1080, the control circuit 30 determines the diagnosis result for the display panel 24 as "non-faulty state" and proceeds to S1040. In S1040, the control circuit 30 transmits the diagnosis result to the first diagnosis device 3 to end the display panel diagnosis process.

[1-11. Trigger SW Diagnosis Process]

Figure 11:
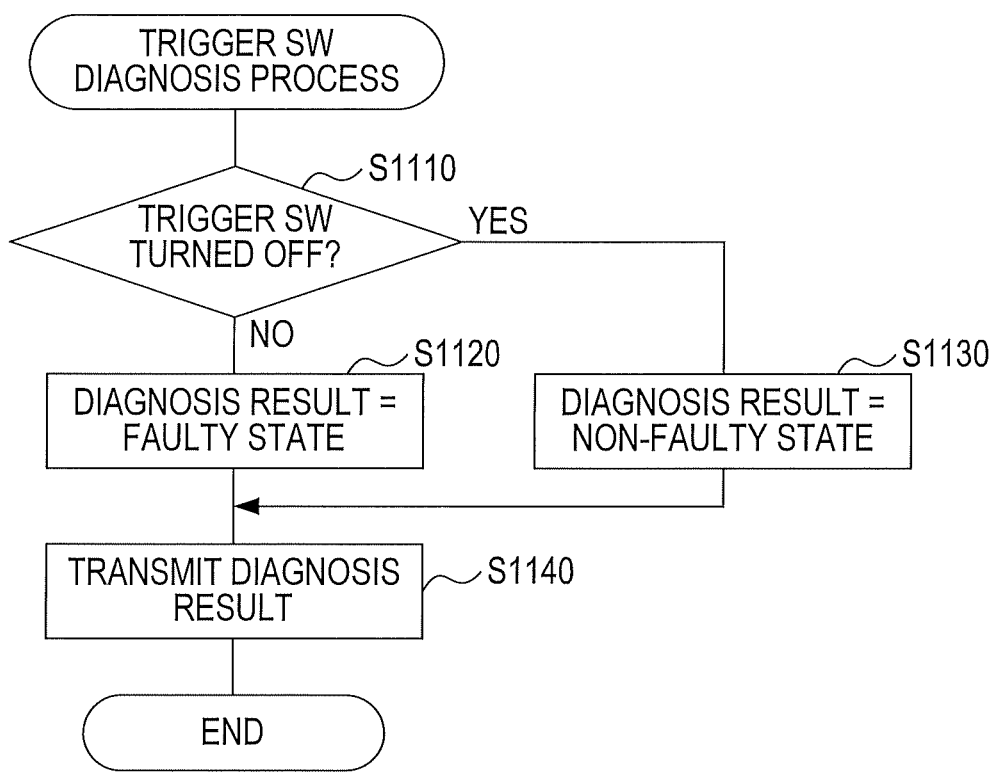
FIG. 11 is a flowchart showing a trigger SW diagnosis process of the first embodiment.

With reference to FIG. 11, descriptions are given to details of the above-described trigger SW diagnosis process.

First, in S1110, the control circuit 30 determines whether the trigger SW 23 is placed in an OFF-state. In a case where the first diagnosis device 3 is connected to the first tool main body 10, the first tool main body 10 cannot be used as a tool. In this case, the trigger SW 23 is not manipulated by the user and is normally placed in the OFF-state. If the trigger SW 23 is placed in the OFF-state (S1110: YES), then the control circuit 30 proceeds to S1130. If the trigger SW 23 is not placed in the OFF-state (S1110: NO), then the control circuit 30 proceeds to S1120.

In S1120, the control circuit 30 determines a diagnosis result for the trigger SW 23 as "faulty state". In S1130, the control circuit 30 determines the diagnosis result for the trigger SW 23 as "non-faulty state".

Subsequently, in S1140, the control circuit 30 transmits the diagnosis result for the trigger SW 23 to the first diagnosis device 3 to end the trigger SW diagnosis process.

[1-12. Effects]

As described above, in response to receipt of the diagnosis command signal from the first diagnosis device 3, the first tool main body 10 executes the failure diagnosis in response to a diagnosis command included in the diagnosis command signal. In other words, the first tool main body 10 does not estimate a failure part based on the past information, but rather practically executes the failure diagnosis to locate the failure part. Thus, since the first tool main body 10 practically executes the failure diagnosis in response to the diagnosis command signal, it is possible to improve determination accuracy for the failure part in comparison with a case where the failure part is estimated.

Furthermore, the first tool main body 10 practically executes the failure diagnosis in response to receipt of the diagnosis command signal from the first diagnosis device 3. In other words, the first tool main body 10 does not diagnose the failure part based on the past usage history information, but on the most recent state of the first tool main body 10. Thus, since the first tool main body 10 executes the failure diagnosis based on the most recent state, it is possible to diagnose the failure part with improved accuracy.

Additionally, in the first tool main body 10, the failure diagnosis is not executed by the first diagnosis device 3, which is provided externally to the first tool main body 10, but by the control circuit 30 included in the first tool main body 10. Thus, in the first tool main body 10, it is possible to inhibit the failure diagnosis from being executed in accordance with an erroneous process as long as the control circuit 30 stores an appropriate process (alternately, an algorithm) of the failure diagnosis for the type of the first tool main body 10.

The control circuit 30 executes the failure diagnosis at least on the driving circuit 50, the current detection circuit 25, and the rotation sensor 26. Thus, it is possible to locate, with enhanced accuracy, a failure part in an essential part associated with driving of the motor 60 in comparison with estimation of the failure part based on the usage history information.

The control circuit 30 executes the diagnosis of the driving circuit 50, the current detection circuit 25, and the rotation sensor 26 in this order and therefore, it is possible to firstly identify a failure of the driving circuit 50. Accordingly, in the first tool main body 10, it is possible to inhibit the failure of the driving circuit 50 from resulting in to an erroneous determination that the current detection circuit 25 and the rotation sensor 26 fail.

In the first tool main body 10, the current detection circuit 25 is given with a higher priority in respect of the diagnosis than the rotation sensor 26 is. As a result, in the first tool main body 10, it is possible to find the failure of the current detection circuit 25 at an earlier stage and therefore to inhibit an occurrence of serious risk such as overcurrent. Therefore, according to the first tool main body 10, it is possible to inhibit an erroneous determination on the failure and also to inhibit an occurrence of serious risk.

As described above, the first tool main body 10 is configured to be alternately connected to the battery pack 70 or the first diagnosis device 3. In other words, in the first tool main body 10, the diagnosis is executed exclusively to a case where the connection is made to the first diagnosis device 3. As a result, it is possible to inhibit the diagnosis from being executed in a case where the first tool main body 10 is connected to the battery pack 70 and can be used by the user.

In other words, in the first tool main body 10, it is possible to inhibit, in a case where the connection is made to the battery pack 70, the diagnosis from being executed without intention of the user and therefore to inhibit occurrence of an accident (for example, injury of the user) due to execution of the diagnosis.

[1-13. Correspondence Between Terms]

In the first embodiment, the first tool main body 10 corresponds to one example of the electric powered work machine of the present disclosure. The epicyclic gearing 109 and the impact mechanism 106 correspond to one example of the tool driver of the present disclosure. The first connector 20*a* corresponds to one example of the external device connector of the present disclosure. The first positive terminal 11 and the first negative terminal 12 correspond to one example of the electric power terminal of the present disclosure. The first signal terminal 13, the first serial communication terminal 14A, and the second serial communication terminal 14B correspond to one example of the signal terminal of the present disclosure.

The control circuit 30 corresponds to respective one examples of the command receiver, the diagnosis circuit, the result transmitter, and the battery communication processor of the present disclosure. The battery voltage detector 22 corresponds to one example of the voltage detector of the present disclosure. The display panel 24 corresponds to one example of the display of the present disclosure. The trigger SW 23 corresponds to one example of the manipulation switch of the present disclosure.

The driving circuit 50 corresponds to one example of the motor driving circuit of the present disclosure. The current detection circuit 25 corresponds to one example of the motor current detector of the present disclosure. The rotation sensor 26 corresponds to one example of the rotational position detector of the present disclosure.

2. Other Embodiments

The embodiment of the present disclosure has been described hereinabove. Nevertheless, the present disclosure is not limited to the above-described embodiment, but can be embodied in various forms without departing from the spirit of the present disclosure.

(2a) In the above-described first embodiment, the electric powered work machine 2 (specifically, the first tool main body 10) executes the full duplex serial communication with the first diagnosis device 3. However, the mode of communication of the present disclosure is not limited to the full duplex serial communication, and half duplex serial communication may be employed.

Furthermore, in the above-described first embodiment, the electric powered work machine 2 (specifically, the first tool main body 10) is connected to the first diagnosis device 3 in a wired manner via the first connector 20*a* and the first connection adapter 80. However, the mode of connection of the present disclosure is not limited to the above-described mode. For example, as in a second tool main body 10*a* shown in FIG. 12, an electric powered work machine may include a second connector 20*b* and/or a wireless communicator 28 in addition to the first connector 20*a*. In the second tool main body 10*a*, similar elements as in the first tool main body 10 are denoted with the same reference numerals as in the first embodiment.

The second connector 20*b* is configured to be detachably connected to the first connection adapter 80 of the first diagnosis device 3. The second connector 20*b* includes a second positive terminal 41, a second negative terminal 42, a second signal terminal 43, a third serial communication terminal 44A, and a fourth serial communication terminal 44B. The second positive terminal 41 and the second negative terminal 42 complete a power supply path from the device power source 91 to the motor 60 via the first connection adapter 80. The second signal terminal 43, the third serial communication terminal 44A, and the fourth serial communication terminal 44B complete communication paths between the control circuit 30 and the first calculator 90. The second connector 20*b* is configured to receive the diagnosis command signal from the first diagnosis device 3 and/or to transmit the diagnosis result signal to the first diagnosis device 3 via the third serial communication terminal 44A and the fourth serial communication terminal 44B.

Figure 12:
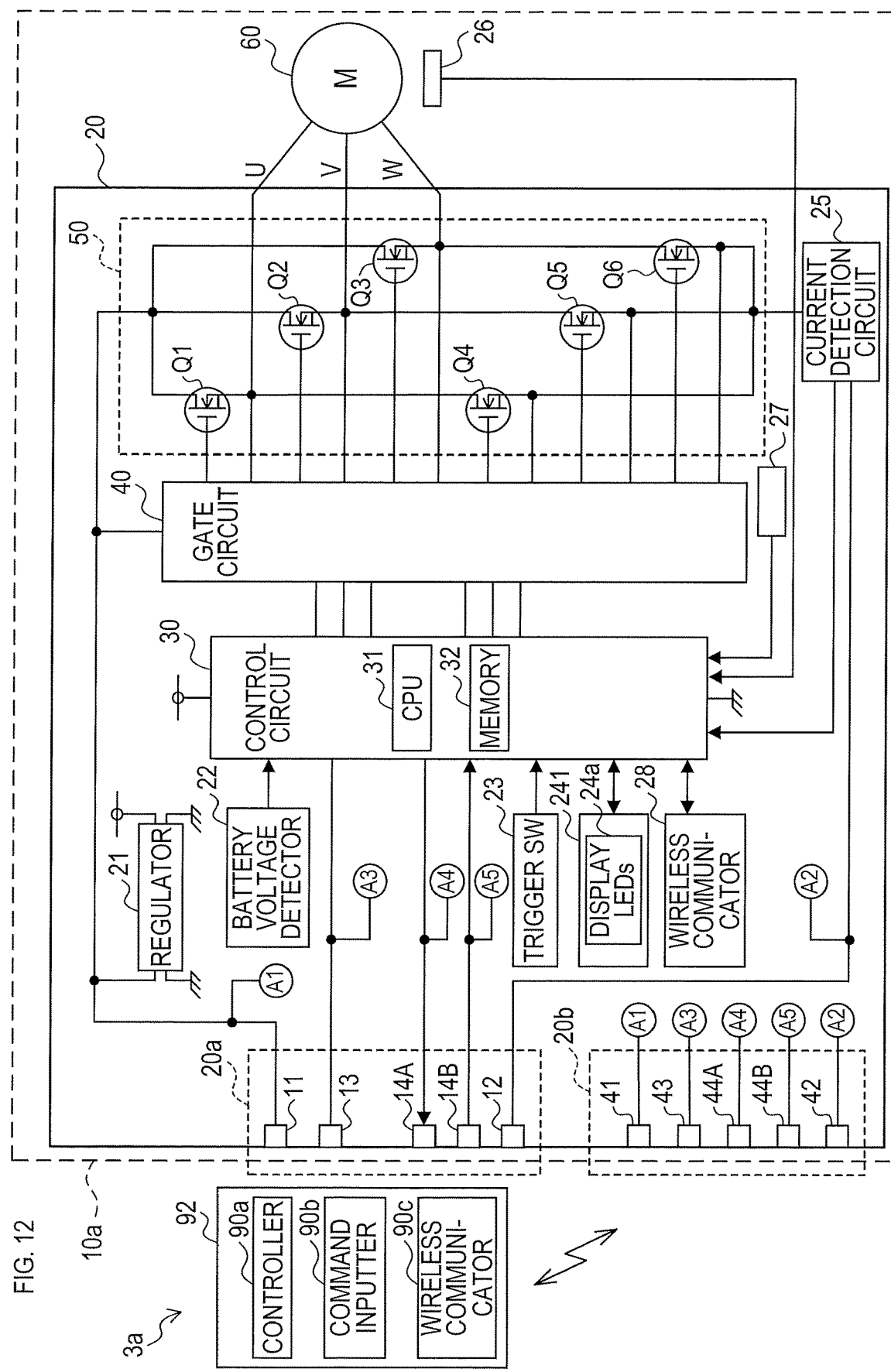
FIG. 12 is a block diagram showing configurations of a second tool main body and a second diagnosis device of another embodiment.

The wireless communicator 28 is configured to be wirelessly connected to a second diagnosis device 3a, which is shown in FIG. 12. The second diagnosis device 3a includes a second calculator 92. The second calculator 92 is different from the first calculator 90 in that a wireless communicator 90c is added. The wireless communicator 90c executes a wireless communication based on a command from the controller 90a. The wireless communicator 28 performs a data communication with the wireless communicator 90c through the wireless communication. The wireless communication includes a short-distance wireless communication.

Examples of the short-distance wireless communication include a wireless communication that conforms to the standard for Bluetooth (registered trademark). The wireless communicator 28 is configured to receive a diagnosis command signal from the second diagnosis device 3a and/or to transmit a diagnosis result signal to the second diagnosis device 3a through the wireless communication.

Due to the second connector 20b and the wireless communicator 28 being added as described above, it is possible to execute a failure diagnosis of the second tool main body 10a based on the diagnosis command signal from the first diagnosis device 3 or the diagnosis command signal from the second diagnosis device 3a with the battery pack 70 connected to the second tool main body 10a.

Figure 13:
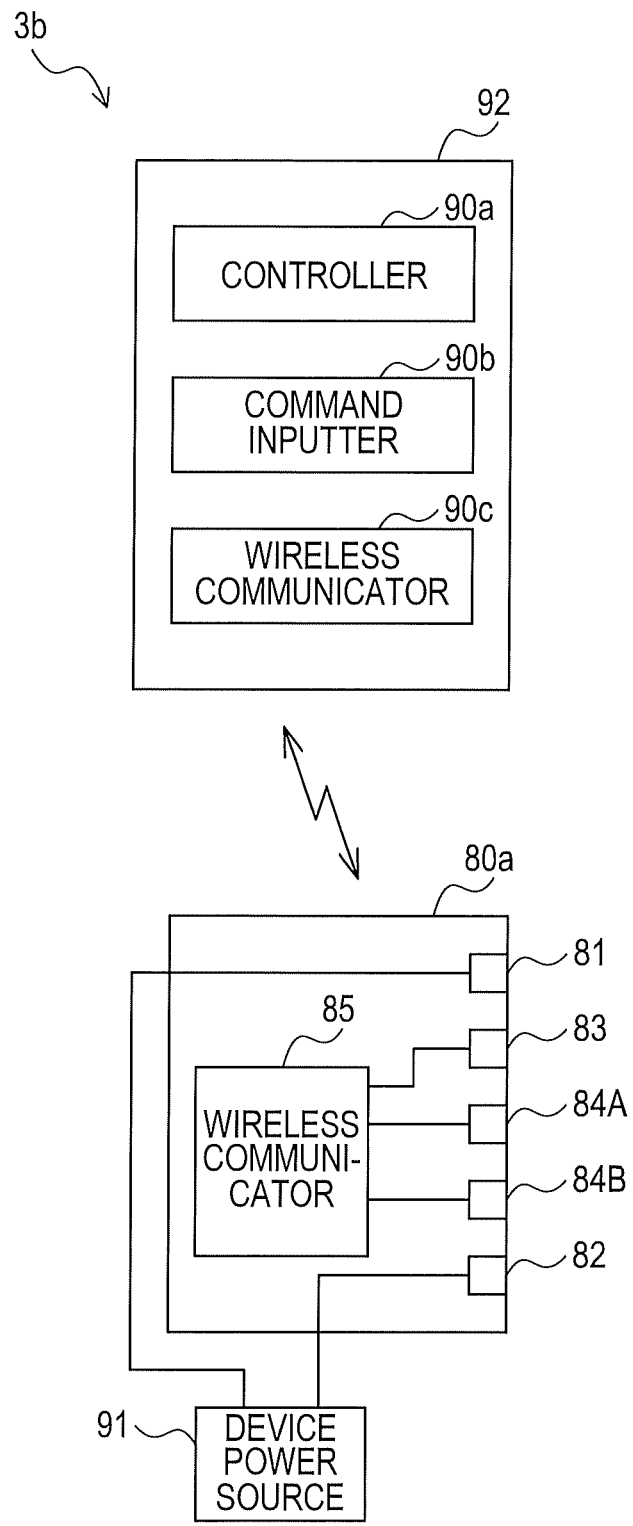
FIG. 13 is a block diagram showing a configuration of a third diagnosis device of still another embodiment.

Furthermore, the diagnosis device of the present disclosure is not limited to the above-described first diagnosis device 3 or second diagnosis device 3a, and may be configured to be similar to a third diagnosis device 3b, which is shown in FIG. 13. The third diagnosis device 3b includes the above-described second calculator 92 and a second connection adapter 80a. The second connection adapter 80a is different from the first connection adapter 80 in that (i) a wireless communicator 85 is added and (ii) the adapter signal terminal 83, the first adapter communication terminal 84A, and the second adapter communication terminal 84B are connected to the wireless communicator 85. Thus, the second connection adapter 80a can be detachably connected to the first connector 20a and the second connector 20b. The wireless communicator 85 is connected in a wired manner with the control circuit 30 via the adapter signal terminal 83, the first adapter communication terminal 84A, and the second adapter communication terminal 84B. Thus, the wireless communicator 85 receives various information from the control circuit 30 and/or transmits various information to the control circuit 30 through the wired communication. Furthermore, the wireless communicator 85 is wirelessly connected to the wireless communicator 90c. The wireless communicator 85 receives various information from the wireless communicator 90c and/or transmits various information to the wireless communicator 90c through the wireless communication. The second calculator 92 is wirelessly connected to the first tool main body 10 or the second tool main body 10a via the second connection adapter 80a to receive various information from the first tool main body 10 or the second tool main body 10a, and/or to transmit various information to the first tool main body 10 or the second tool main body 10a.

Accordingly, in the third diagnosis device 3b, the second connection adapter 80a is connected in the wired manner to the first tool main body 10 or the second tool main body 10a, while the second calculator 92 is wirelessly connected to the second connection adapter 80a. The third diagnosis device 3b transmits a diagnosis command signal to the first tool main body 10 or the second tool main body 10a, while receiving a diagnosis result signal from the first tool main body 10 or the second tool main body 10a.

Various methods are considered for connecting a diagnosis device to a tool main body through wireless communication. For example, the tool main body may be provided with a wireless communicator, or a connection adapter, which is connected to the tool main body, may be provided with the wireless communicator.

In the second tool main body 10a, the second tool main body 10a corresponds to one example of the electric powered work machine of the present disclosure. The first connector 20a corresponds to one example of the external device connector or the battery pack connector of the present disclosure. The second connector 20b corresponds to one example of the diagnosis device connector of the present disclosure. The wireless communicator 28 corresponds to one example of the wireless communicator of the present disclosure.

In the second connector 20b, the second positive terminal 41 and the second negative terminal 42 may be omitted. In this case, the electric power supplied from the battery pack 70 may be used instead of the electric power supplied from the device power source 91. Consequently, it is possible to drive the second tool main body 10a and diagnose the second tool main body 10a based on the diagnosis command signal from the first diagnosis device 3 concurrent with each other.

(2b) In the above-described first embodiment, diagnosis subjects include the driving circuit 50, the current detection circuit 25, the rotation sensor 26, the battery voltage detector 22, the display panel 24, and the trigger SW 23. However, the diagnosis subjects are not limited to those mentioned above. For example, the diagnosis subjects may include the temperature sensor 27. Alternately, at least one of the driving circuit 50, the current detection circuit 25, the rotation sensor 26, the battery voltage detector 22, the display panel 24, or the trigger SW 23 may be excluded from the diagnosis subjects. The diagnosis of the temperature sensor 27 may include a determination whether a temperature detected by the temperature sensor 27 falls within a normal temperature range. The diagnosis may be executed when, for example, the first tool main body 10 is not in use. A failure of the temperature sensor 27 may be determined based on a determination whether the temperature detected by the temperature sensor 27 falls within the normal temperature range (for example, 0° C. to 50° C.). If the temperature detected by the temperature sensor 27 has fallen within the normal temperature range, then the temperature sensor 27 may be determined to be in a non-faulty state. If the temperature detected by the temperature sensor 27 has been deviated from the normal temperature range, then the temperature sensor 27 may be determined to fail.

(2c) In the above-described first embodiment, the diagnosis is executed in the order of the driving circuit 50, the current detection circuit 25, the rotation sensor 26, the battery voltage detector 22, the display panel 24, and the trigger SW 23. However, the order of diagnosis is not limited to the aforementioned order. For example, the diagnosis may be executed in an order of the driving circuit 50, the current detection circuit 25, the rotation sensor 26, the display panel 24, the trigger SW 23, and the battery voltage detector 22.

(2d) In the above-described first embodiment, the descriptions are made to the electric powered work machine that is driven by the electric power of the battery pack. However, the present disclosure is not limited to such an electric powered work machine. The present disclosure may be applied to, for example, an electric powered work machine that is driven by electric power that is supplied from a commercial power source instead of the electric power of the battery pack. Furthermore, the present disclosure may be applied to an electric powered work machine that receives both the electric power from the battery pack and the electric power from the commercial power source.

Figure 14:
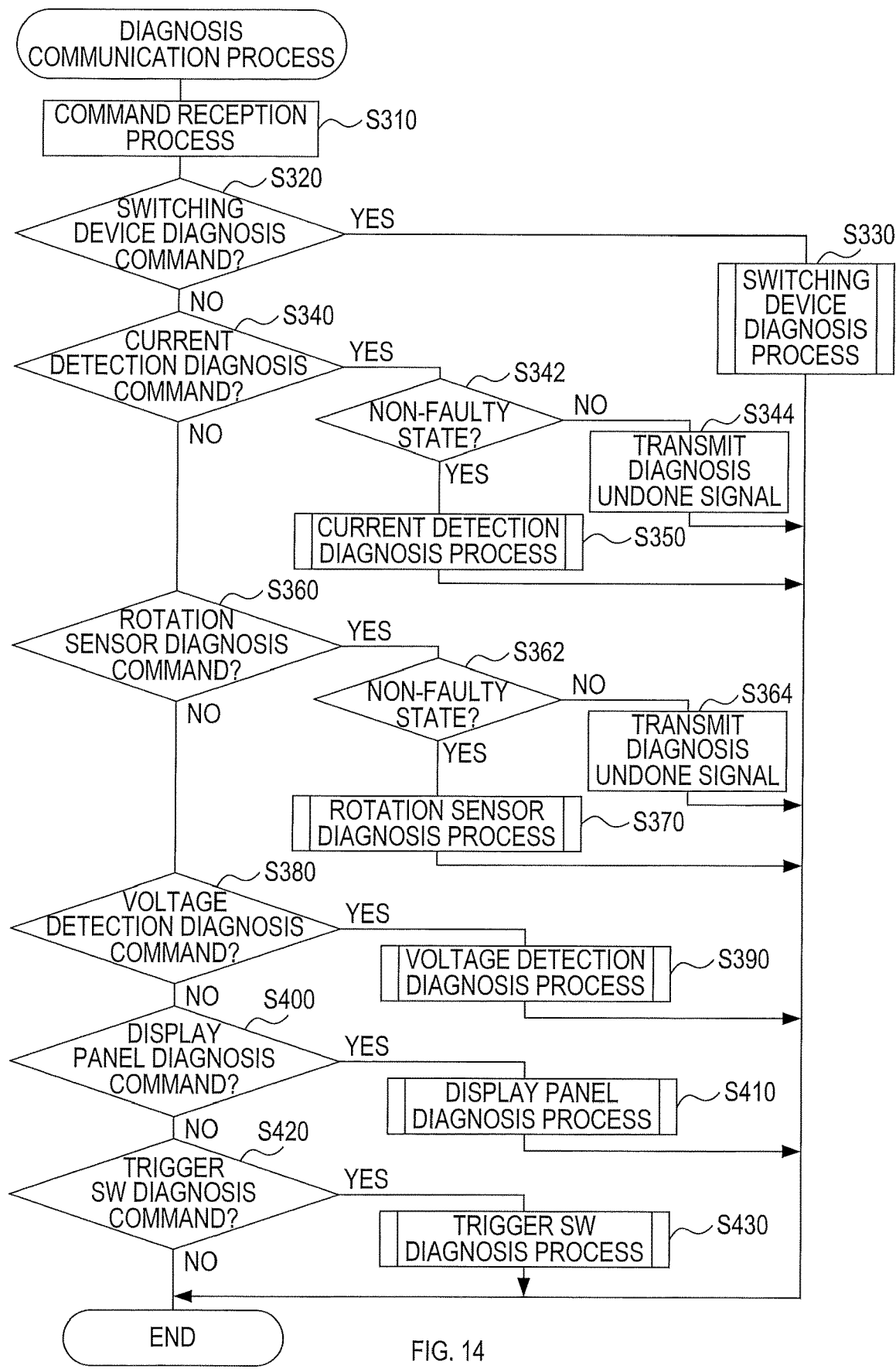
FIG. 14 is a flowchart showing a modified example of the diagnosis communication process.

(2e) In the above described embodiment, the descriptions are made to a configuration in which the failure diagnosis is always executed in response to receipt of the diagnosis command signal. However, the present disclosure is not limited to such a configuration. For example, the diagnosis communication process is not limited to the above-described procedure shown in FIG. 5. The diagnosis communication process may include, as in a modified example of the diagnosis communication process shown in FIG. 14, a process in which a determination is made whether all of the first to the sixth switching devices Q1 to Q6 are placed in the non-faulty state and, if one of the first to the sixth switching devices Q1 to Q6 is not placed in the non-faulty state, then the diagnosis is not executed. In FIG. 14, the same steps as in the steps shown in FIG. 5 are denoted with the same reference numerals.

In the modified example, if a positive determination is made in S340, then the control circuit 30 proceeds to S342 to determine whether all of the first to the sixth switching devices Q1 to Q6 are placed in the non-faulty state. If all of the first to the sixth switching devices Q1 to Q6 are placed in the non-faulty state (S342: YES), then the control circuit 30 proceeds to S350 to execute the current detection diagnosis process. If one of the first to the sixth switching devices Q1 to Q6 is not placed in the non-faulty state (S342: NO), then the control circuit 30 proceeds to S344 to transmit a diagnosis undone signal to the first diagnosis device 3 (S344). The diagnosis undone signal notifies the first diagnosis device 3 that the diagnosis has not been executed. If a positive determination is made in S360, then the control circuit 30 proceeds to S362 to determine whether all of the first to the sixth switching devices Q1 to Q6 are placed in the non-faulty state. If all of the first to the sixth switching devices Q1 to Q6 are placed in the non-faulty state (S362: YES), then the control circuit 30 proceeds to S370 to execute the rotation sensor diagnosis process (S370). If one of the first to the sixth switching devices Q1 to Q6 is not placed in the non-faulty state (S362: NO), then the control circuit 30 proceeds to S364 to transmit the diagnose undone signal to the first diagnosis device 3 (S364). In response to completion of the process in S334 or S364, the control circuit 30 ends the diagnosis communication process. According to the modified example, it is possible to inhibit the current detection diagnosis process and the rotation sensor diagnosis process from being executed under circumstances where one of the first to the sixth switching devices Q1 to Q6 is not placed in the non-faulty state and therefore to inhibit decrease in accuracy of the diagnosis.

Alternately, the first diagnosis device 3, the second diagnosis device 3a, or the third diagnosis device 3b may be configured not to output the current detection diagnosis command and the rotation sensor diagnosis command in a case of receiving a diagnosis result that one of the first to the sixth switching devices Q1 to Q6 is not placed in the non-faulty state.

(2f) Two or more functions performed by a single element in the aforementioned embodiments may be achieved by two or more elements, or a function performed by two or more elements may be achieved by a single element. Also, at least a part of a configuration in the aforementioned embodiments may be replaced with a publicly-known configuration having a similar function. Furthermore, a part of a configuration in the aforementioned embodiments may be omitted. Moreover, at least a part of a configuration in the aforementioned embodiments may be added to, or may replace, another configuration in the aforementioned embodiments. Any form included in the technical idea defined only by the language of the claims may be an embodiment of the present disclosure.

What is claimed is:

1. An electric powered work machine comprising:
   a motor configured to generate a rotating force;
   a tool driver configured to receive the rotating force to thereby drive a tool;
   a battery communication processor configured to communicate with a battery pack;
   an external device connector (i) configured to be interchangeably connected to a diagnosis device and the battery pack and (ii) including:
      a first electrical contact configured to receive an electric power supplied to the motor from the battery pack in response to the external device connector being connected to the battery pack,
      a second electrical contact (i) distinct from the first electrical contact and (ii) configured to establish a first transmission path between the battery communication processor and the battery pack in response to the external device connector being connected to the battery pack, and
      a third electrical contact (i) distinct from both of the first electrical contact and the second electrical contact and (ii) configured to establish a second transmission path between the battery communication processor and the battery pack in response to the external device connector being connected to the battery pack, the second transmission path being distinct from the first transmission path;
   a command receiver configured to receive a diagnosis command signal from the diagnosis device connected to the external device connector;
   a diagnosis circuit configured to execute a failure diagnosis of the electric powered work machine in response to the command receiver receiving the diagnosis command signal; and
   a result transmitter configured to transmit a diagnosis result signal to the diagnosis device connected to the external device connector, the diagnosis result signal indicating a result of the failure diagnosis that is executed by the diagnosis circuit.

2. The electric powered work machine according to claim 1, further comprising:
   a motor driving circuit configured to supply an electric current to the motor, a motor current detector configured to detect a magnitude of the electric current that flows through the motor, and/or
   a rotational position detector configured to detect a rotational position of the motor,
   wherein the diagnosis circuit is configured to diagnose the motor driving circuit, the motor current detector, and/or the rotational position detector in the failure diagnosis.

3. The electric powered work machine according to claim 2, wherein the diagnosis circuit is configured to:
   in the failure diagnosis,
   diagnose the motor driving circuit,
diagnose the motor current detector after completion of diagnosing the motor driving circuit, and diagnose the rotational position detector after completion of diagnosing the motor current detector.

4. The electric powered work machine according to claim 2, wherein the motor driving circuit includes switching devices, the switching devices each being configured to conduct or interrupt the electric current to the motor, and wherein the diagnosis circuit is configured, in the failure diagnosis, (i) to turn ON the switching devices at least one by one alternately and (ii) to diagnose the motor driving circuit based on the magnitude of the electric current that is detected by the motor current detector.

5. The electric powered work machine according to claim 2, wherein the diagnosis circuit is configured, in the failure diagnosis, (i) to supply the electric current to the motor via the motor driving circuit and (ii) to diagnose the motor current detector based on the magnitude of the electric current that is detected by the motor current detector.

6. The electric powered work machine according to claim 2, wherein the diagnosis circuit is configured, in the failure diagnosis, (i) to rotate the motor at a specified rotational speed and (ii) to diagnose the rotational position detector based on the rotational position that is detected by the rotational position detector.

7. The electric powered work machine according to claim 2,
wherein the motor driving circuit includes a full-bridge circuit including:
a first arm including a first high-side switch and a first low-side switch, and
a second arm including a second high-side switch and a second low-side switch, and
wherein the diagnosis circuit is configured to turn ON the first high-side switch and the second low-side switch in the failure diagnosis.

8. The electric powered work machine according to claim 7,
wherein the diagnosis circuit is configured to, in the failure diagnosis, (i) turn OFF the first high-side switch and the second low-side switch and (ii) then subsequently turn ON the first low-side switch and the second high-side switch.

9. The electric powered work machine according to claim 1,
wherein the second electrical contact is (i) connected to the command receiver and (ii) configured to receive the diagnosis command signal from the diagnosis device connected to the external device connector, and
wherein the third electrical contact is (i) connected to the result transmitter and (ii) configured to receive the diagnosis result signal from the result transmitter.

10. The electric powered work machine according to claim 1, further comprising:
a diagnosis device connector configured to be connected to the diagnosis device;
a first transmission path configured to transmit the diagnosis command signal from the diagnosis device connector to the command receiver; and
a second transmission path configured to transmit the diagnosis result signal from the result transmitter to the diagnosis device connector.

11. The electric powered work machine according to claim 1, further comprising:
a battery pack connector configured to be connected a battery pack, the battery pack having an electric power to be supplied to the motor;
a diagnosis device connector configured to be connected to the diagnosis device;
a first transmission path configured to transmit the diagnosis command signal from the diagnosis device connector to the command receiver; and
a second transmission path configured to transmit the diagnosis result signal from the result transmitter to the diagnosis device connector.

12. The electric powered work machine according to claim 1, further comprising a wireless communicator configured to perform a wireless communication with the diagnosis device,
wherein the command receiver is configured to receive the diagnosis command signal from the diagnosis device via the wireless communicator, and
wherein the result transmitter is configured to transmit the diagnosis result signal to the diagnosis device via the wireless communicator.

13. The electric powered work machine according to claim 1,
wherein the first transmission path is configured to transmit a first signal from the battery communication processor to the battery pack, and
wherein the second transmission path is configured to transmit a second signal from the battery pack to the battery communication processor.

14. An electric powered work machine comprising:
a motor configured to generate a rotating force;
a tool driver configured to receive the rotating force to thereby drive a tool;
a command receiver configured to receive a diagnosis command signal from a diagnosis device;
a diagnosis circuit configured to execute a failure diagnosis of the electric powered work machine in response to the command receiver receiving the diagnosis command signal; and
a result transmitter configured to transmit a diagnosis result signal to the diagnosis device, the diagnosis result signal indicating a result of the failure diagnosis that is executed by the diagnosis circuit,
the electric powered work machine further comprising:
a voltage detector configured to detect a voltage of a battery that supplies an electric power to the motor;
a display configured to provide information relating to the electric powered work machine; and/or
a manipulation switch configured to be manipulated by a user of the electric powered work machine,
wherein the diagnosis circuit is configured to diagnose the voltage detector, the display, and/or the manipulation switch in the failure diagnosis,
wherein the display includes LEDs, and
wherein the diagnosis circuit is configured, in the failure diagnosis, (i) to drive the LEDs so that the display is placed in a specified display state and (ii) to diagnose the display based on a magnitude of an electric current that flows through the LEDs.

15. The electric powered work machine according to claim 14, wherein the specified display state corresponds to all the LEDs being turned on or being turned off.

16. A job-site electrical system, comprising:
an electric powered work machine including:
a motor configured to generate a rotating force;
a tool driver configured to receive the rotating force to thereby drive a tool;
a battery communication processor configured to communicate with a battery pack;
an external device connector (i) configured to be interchangeably connected to a diagnosis device and the battery pack and (ii) including:

a first electrical contact configured to receive an electric power supplied to the motor from the battery pack in response to the external device connector being connected to the battery pack, a second electrical contact (i) distinct from the first electrical contact and (ii) configured to establish a first transmission path between the battery communication processor and the battery pack in response to the external device connector being connected to the battery pack, and a third electrical contact (i) distinct from both of the first electrical contact and the second electrical contact and (ii) configured to establish a second transmission path between the battery communication processor and the battery pack in response to the external device connector being connected to the battery pack, the second transmission path being distinct from the first transmission path;

a command receiver configured to receive a diagnosis command signal from the diagnosis device connected to the external device connector;

a diagnosis circuit configured to execute a failure diagnosis of the electric powered work machine in response to the command receiver receiving the diagnosis command signal; and a result transmitter configured to transmit a diagnosis result signal to the diagnosis device connected to the external device connector, the diagnosis result signal indicating a result of the failure diagnosis that is executed by the diagnosis circuit; and the diagnosis device configured (i) to transmit the diagnosis command signal to the electric powered work machine and (ii) to receive the diagnosis result signal from the electric powered work machine.

17. A method of diagnosing an electric powered work machine, the method comprising:

connecting a diagnosis device in place of a battery pack to an external device connector of the electric powered work machine, the external device connector being configured (i) to be shared between the diagnosis device and the battery pack, and (ii) to be interchangeably connected to the diagnosis device and the battery pack;

transmitting a diagnosis command signal from the diagnosis device to the electric powered work machine;

executing a failure diagnosis of the electric powered work machine by the electric powered work machine in response to the electric powered work machine receiving the diagnosis command signal; and transmitting a diagnosis result signal from the electric powered work machine to the diagnosis device, the diagnosis result signal indicating a result of the failure diagnosis.

* * * * *